(12) United States Patent
Branscombe et al.

(10) Patent No.: US 11,189,172 B2
(45) Date of Patent: Nov. 30, 2021

(54) PROJECTED ZONE OVERLAP

(71) Applicant: Modular Mining Systems, Inc., Tucson, AZ (US)

(72) Inventors: Edward A. Branscombe, Tucson, AZ (US); Christopher J. Utter, Tucson, AZ (US); William M. Casson, Tucson, AZ (US)

(73) Assignee: MODULAR MINING SYSTEMS, INC., Tucson, AZ (US)

( * ) Notice: Subject to any disclaimer, the term of this patent is extended or adjusted under 35 U.S.C. 154(b) by 273 days.

(21) Appl. No.: 16/354,629

(22) Filed: Mar. 15, 2019

(65) Prior Publication Data

US 2019/0287407 A1    Sep. 19, 2019

Related U.S. Application Data

(60) Provisional application No. 62/643,499, filed on Mar. 15, 2018.

(51) Int. Cl.
| | |
|---|---|
| *G08G 1/16* | (2006.01) |
| *G01C 21/34* | (2006.01) |
| *G08G 1/056* | (2006.01) |
| *G08G 1/052* | (2006.01) |
| *G01C 21/36* | (2006.01) |

(52) U.S. Cl.
CPC ......... *G08G 1/166* (2013.01); *G01C 21/3461* (2013.01); *G01C 21/3667* (2013.01); *G08G 1/052* (2013.01); *G08G 1/056* (2013.01); *G08G 1/161* (2013.01); *G08G 1/164* (2013.01)

(58) Field of Classification Search
CPC ........ G08G 1/166; G08G 1/052; G08G 1/056; G08G 1/161; G08G 1/164; G01C 21/3461; G01C 21/3667
See application file for complete search history.

(56) References Cited

U.S. PATENT DOCUMENTS

| | | | |
|---|---|---|---|
| 5,432,509 A | 7/1995 | Kajiwara | |
| 6,393,362 B1* | 5/2002 | Burns | G05D 1/0278 340/940 |
| 8,095,248 B2* | 1/2012 | Rottig | G01S 19/14 701/2 |
| 8,583,361 B2* | 11/2013 | Lewis | G07C 5/0841 701/408 |
| 9,842,501 B2* | 12/2017 | Osagawa | G05D 1/0289 |
| 10,215,583 B2* | 2/2019 | Ng-Thow-Hing | G02B 27/01 |
| 10,816,986 B2* | 10/2020 | Manjunath | G01S 5/0284 |
| 2010/0104199 A1* | 4/2010 | Zhang | G08G 1/165 382/199 |

(Continued)

*Primary Examiner* — Ig T An
(74) *Attorney, Agent, or Firm* — Quarles & Brady LLP

(57) ABSTRACT

A system and method for zone projection are presented. Specifically, anticipated paths of travel are determined for a number of different vehicles operating within an environment. Based upon those anticipated paths of travel, as well as likely stopping distances of each vehicle, the system generate zones around each vehicle. These projected zones define a geographical region into which each vehicle is likely to proceed as it maneuvers about the environment. With the zones determined, the system is configured to detect zones that overlap, and, when such overlapping zones are detected, can generate an alarm warning of a potential collision condition that may exist between the two corresponding vehicles.

13 Claims, 17 Drawing Sheets

(56) References Cited

U.S. PATENT DOCUMENTS

| | | |
|---|---|---|
| 2016/0223350 A1 | 8/2016 | Lewis et al. |
| 2017/0300049 A1* | 10/2017 | Seally .................. G06Q 10/047 |
| 2018/0286242 A1* | 10/2018 | Talamonti ............. B60W 30/14 |
| 2018/0354557 A1* | 12/2018 | Kaufmann ........... B62D 15/029 |

* cited by examiner

PROJECTED ZONE OVERLAP

CROSS-REFERENCE TO RELATED APPLICATIONS

This application is a continuation of and claims priority to U.S. Provisional Patent Application No. 62/643,499 entitled "Projected Zone Overlap" and filed on Mar. 15, 2018.

BACKGROUND

Mining environments, particularly open pit surface mining environments, present unique challenges to maintaining correct operation of vehicles. The workhorse of a modern surface mine is a mine haul truck, which is a dump truck capable of hauling up to four hundred, and in some cases over four hundred, tons of material. Haul trucks are some of the largest land vehicles ever built. As such, they can be characterized by poor sight lines on every side of the vehicle. In particular, the rear and side opposite to the operator's cabin of a mine-haul truck present enormous blind spots for the haul truck operator.

Within a mining environment there may be many other vehicles such as shovels, dozers, bucket wheel excavators, or other equipment that are each similarly difficult to control. Because the vehicles are so large, they may have large blind spots, large turning radii, and slow braking capabilities, making navigating the vehicles to a given destination difficult. In many cases, though, by accurately positioning these vehicles in proximity to other vehicles or geographical features of the mine, the mine's efficiency may be improved. Additionally, through accurate navigation, dangers of injury or property damage resulting from a collision may be mitigated.

SUMMARY

The present disclosure relates to systems for navigating vehicles and, specifically, systems and methods for projecting spatial zones around a vehicle to predict future movement of the vehicle to facilitate maneuvering and navigation of the vehicle.

In an embodiment, a system includes a location sensor configured to output location data of a first vehicle, a display device connected to the first vehicle, and a processor. The processor is configured to execute instructions for receiving location data from the location sensor to determine a historical path of travel of the vehicle, determining a current speed and a current location of the first vehicle using the location sensor, determining an anticipated path of travel of the first vehicle by extending the historical path of travel by a distance determined by the current speed of the first vehicle, using the anticipated path of travel of the first vehicle to determine a projected zone for the first vehicle, the projected zone identifying a region into which the first vehicle is likely to proceed, determining that the projected zone overlaps, at least partially, with a second projected zone for a second vehicle, and generating an output at the display device indicating a potential collision condition with the second vehicle.

In another embodiment, a system includes a location sensor configured to output location data of a first vehicle, a user interface device connected to the first vehicle, and a processor. The processor is configured to execute instructions for determining an anticipated movement of the first vehicle based upon location data received from the location sensor, using the anticipated movement of the first vehicle to determine a projected zone about the first vehicle, the projected zone identifying a region into which the first vehicle is likely to proceed based on the anticipated movement, determining that the projected zone about the first vehicle overlaps, at least partially, with a second projected zone about a second vehicle, and generating an output at the user interface device indicating a potential collision condition with the second vehicle.

In another embodiment, a method includes determining, using historical location data from a location sensor, an anticipated movement of a first vehicle, using the anticipated movement of the first vehicle to determine a projected zone about the first vehicle, the projected zone identifying a region into which the first vehicle is likely to proceed based on the anticipated movement, determining that the projected zone about the first vehicle overlaps, at least partially, with a second projected zone about a second vehicle or a location within a threshold distance of the second vehicle, and generating an output at a user interface device in the first vehicle indicating a potential collision condition with the second vehicle.

FIGURES

DETAILED DESCRIPTION

Figure 1:
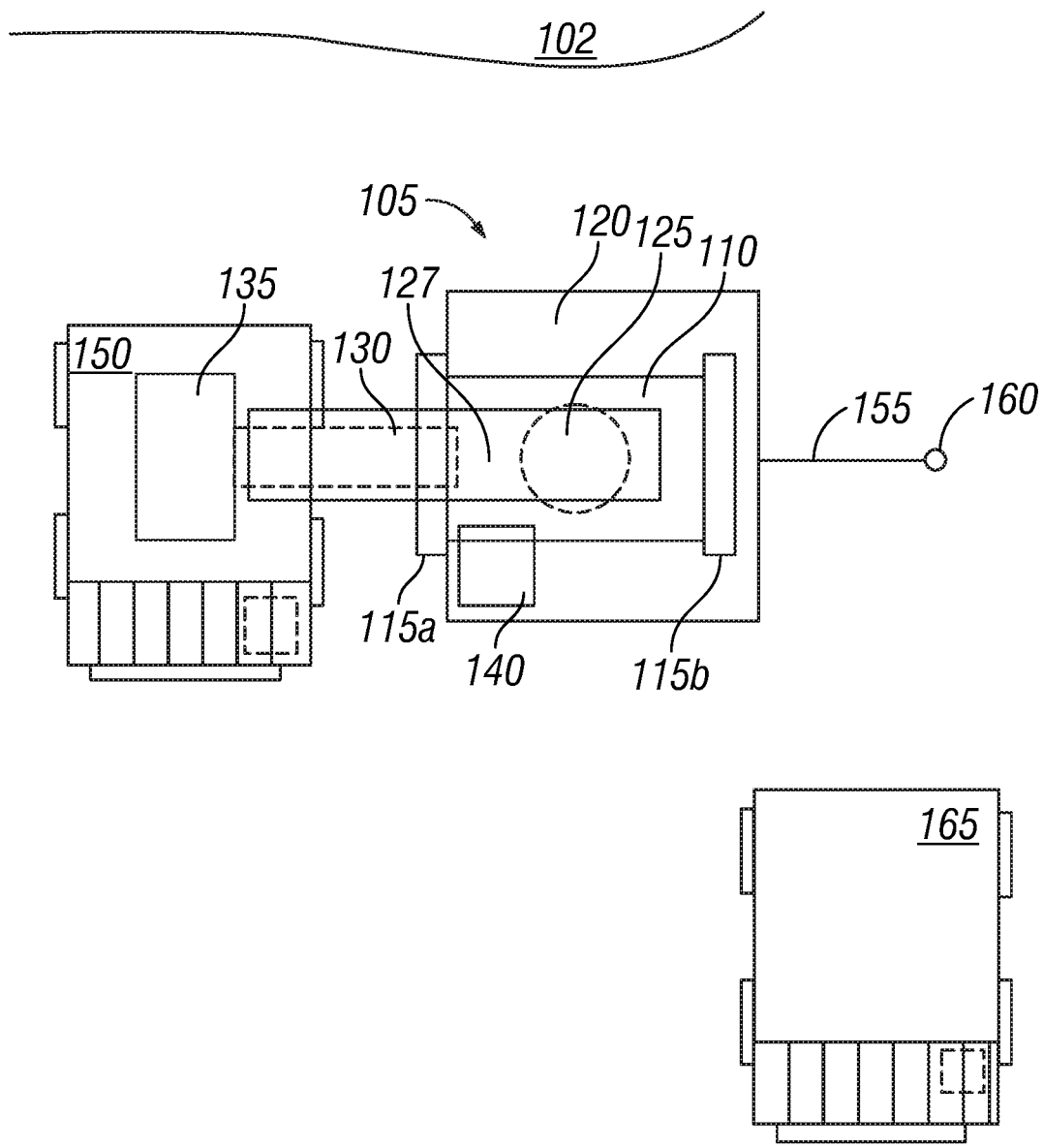
FIG. 1 depicts a mine haul truck approaching a shovel.

In one example of conventional pit mining operations, material is blasted from a face, picked up by a shovel, and loaded into the bed of a haul truck. The haul truck then moves the material through the mining environment to a crusher for processing. At any one time, a large number of other vehicles may be working within a particular mine. Typically a large number of vehicles may be operating in the mine simultaneously, and the likelihood of a first vehicle interfering with the movement of a second vehicle is relatively high.

Collisions between mobile equipment in open pit and underground mines may be a significant source of losses in machine productivity, increases in fuel consumption, and increased maintenance costs. When a vehicle encounters a location with potential contention or interference with another vehicle, the vehicle may need to slow down. In most cases, though, the vehicle is forced to stop and wait for an opportunity when it is safe and procedure dictates that the vehicle may proceed. The delays may be extended when there are multiple vehicles or pieces of equipment at the point of potential contention.

Mine haul vehicles have exceptionally high Gross Vehicle Mass (e.g., greater than 500 tons) and the costs associated with accelerating and stopping a truck may be very high. As a result, the cost of bringing equipment to a complete stop can be very high. For example, from a dead stop an empty truck on a flat grade may take 45 seconds or more to reach nominal speed. The situation is worse for equipment going uphill, loaded, or uphill loaded. It is therefore important to avoid one or more vehicles coming to a complete stop when faced with potential contention or collision conditions. During typical mining operations, each vehicle may move to different locations within the mine to retrieve material, dump material, or to assist in a number of different operations.

One such operation is using a shovel to load material that has been blasted from a rock face into a truck for removing it from a mine. Haul truck loading tends to be a rate limiting operation in the material extraction process of a mine. Conventionally, a haul truck will back up along a path that is perpendicular to a face positioned on one side of a shovel. Once the truck is in position beside the shovel, the shovel operator will retrieve material from the face and load the truck. Once loaded, the truck proceeds to a crusher. Given the size and responsiveness of a conventional mine truck, the process of navigating a truck into a desired position may take some time. Additionally, a collision between a mine haul truck and a shovel or other mining equipment may be catastrophic, resulting in millions of dollars in equipment damage and downtime. Accordingly, mine haul truck drivers tend to be tentative when moving their vehicles into position for loading, further reducing the vehicle's efficiency. Ideally, as a first truck is being loaded on a first side of a shovel, a second truck will move into position on the other side. This maximizes the use of the shovel, allowing the shovel to be continuously engaged in the loading operation, rather than waiting for the next truck to move into position.

Shovels may be several times larger than a haul truck. A typical electric shovel may measure 100 feet in length from the rear of the crawler portion to the end of the shovel's bucket. The overall height of the shovel may measure 70 feet with a typical bucket height of 45 feet. A typical distance from the center of rotation of a shovel to the distal end of the bucket is 80 feet.

FIG. 1 shows a conventional approach for assisting a mine-haul truck to navigate into a loading area besides a shovel. In the arrangement of FIG. 1, power shovel 105 is working at a mine face 102. Power shovel 105 includes lower assembly 110. Lower assembly 110 includes first and second crawler tread 115a, and 115b. Power shovel 105 includes an upper assembly 120, which is rotationally coupled to lower assembly 110 via a rotational bearing 125. Upper assembly 120 includes boom 127. Attached to boom 127 at a hinge is a handle 130. At a distal end of handle 130 is a bucket 135. Upper assembly 120 also includes a cab 140 in which an operator of power shovel 105 resides.

In the example operation shown in FIG. 1, power shovel 105 may be electrically powered. Other shovels, such as hydraulic shovels, may not be powered via a dragline tether or power cable and instead may operate independently. In either case, the upper assembly of a shovel often presents a large structure extending rearwards away from the shovel's cab.

As the shovel rotates, both the boom and rear portion of the upper assembly may pose a hazard to nearby objects as it rotates about the shovel's rotational bearing. Because the shovel and upper assembly can enclose power generation machinery, the upper assembly of a hydraulic digger or shovel may generally extend further in a rearward direction from the vehicle's cab.

The typical arrangement of FIG. 1 shows a first mine haul truck 150 in position to receive material from shovel 105. During the loading of first haul truck 150, however, shovel 105 is rotating back and forth between the first loading position and the face 102. As such, second haul truck 165, which would otherwise be positioned on the opposite side of power shovel 105 from first haul truck 150, must keep clear of the arc of the tail and corners of the upper assembly 120 while loading is occurring at the first loading position. The dangers inherent in backing a haul truck up to an operating shovel often cause truck operators to delay moving into position until the bucket of the shovel is already positioned over the second loading position. This can result in wasteful downtime.

The conventional solution to this problem is to attach a boom 155 ending in a highly visible marker 160 to the tail of the shovel 105. Occasionally, power line markers or traffic cones are used for the highly visible marker 160. Conventionally, the operator of the second truck 165 will use the highly visible marker 160 to align the second truck 165 while the first truck is being loaded. After loading of the first truck 150 is complete, and the shovel rotates the bucket back to the face 102 to pick up more material, the second truck 165 backs into position.

Once loaded with material, a haul truck may then transport the material to a dump site or other area in the mine. A given mining operation may have several loading and dumping locations connected by a road network. These resources have limited capacities and only a finite number of trucks may occupy and interact with a mine resource at a given time. While navigating between the different locations, a vehicle will travel along a particular route following one or more of the mine's roadways or designated throughways. In some cases, a centralized control system is arranged to assign a particular route through the mine to a vehicle.

Figure 2:
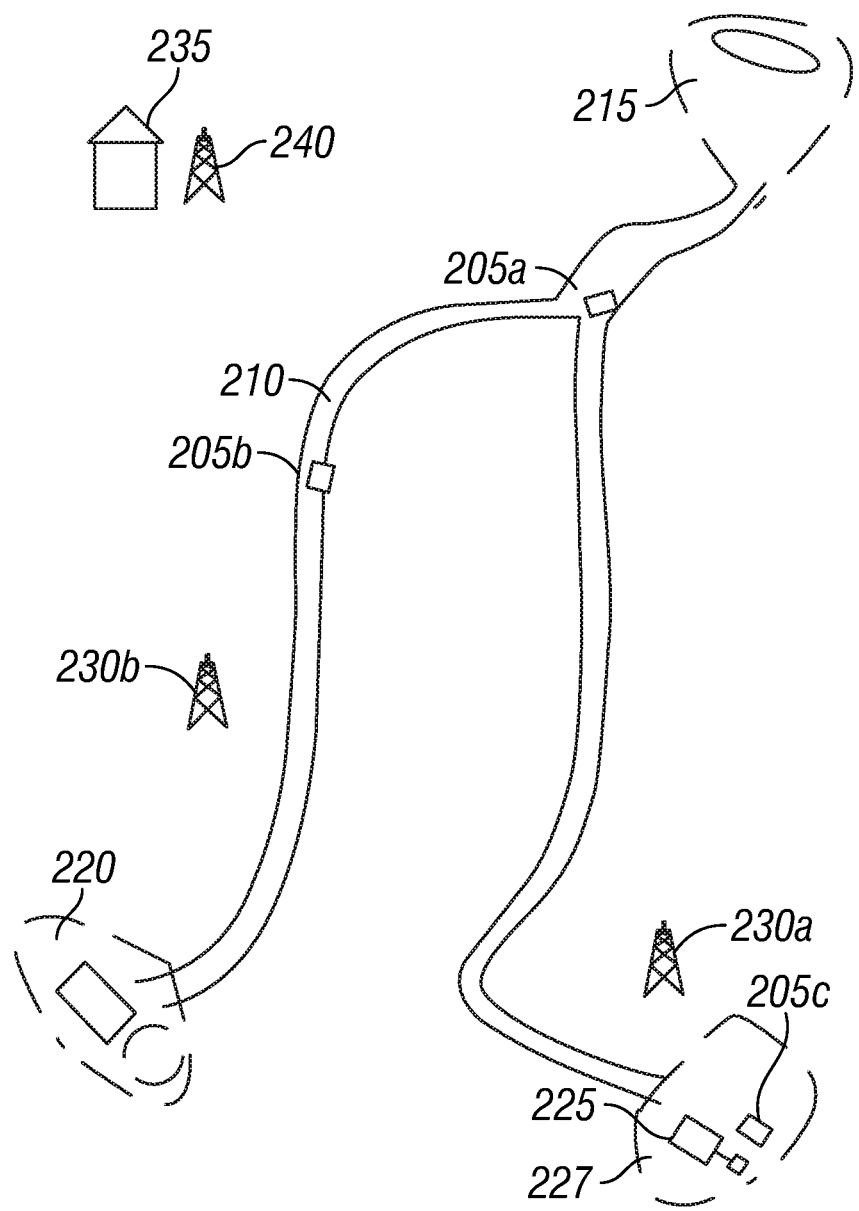
FIG. 2 depicts an example of a mining environment including roadways within the mining environment and vehicles navigating those roadways.

FIG. 2 is an illustration of an open pit mining environment where haul trucks, shovels, and other equipment typically operate. In the environment of FIG. 2, a plurality of mine haul trucks 205a-c operate on a mine haul route network 210. Mine haul trucks 205a-c perform hauling tasks, for example, by moving material between a shovel site 225 a crusher site 220 and a dump or stockpile site 215. Additional vehicles, machinery, or equipment may be present in the mine as well, and as the vehicles go through their typical operations the potential for contention conditions may arise.

In some mining environments there may be methods in place to mitigate or reduce contention conditions, but the current methods have certain drawbacks. Typical systems that may be currently in use are often inaccurate in providing feedback during low-speed maneuvers, such as parking a haul truck or navigating to a loading zone near a shovel.

False-alarms warning of impending collision are common, causing unnecessary braking situations where a haul truck must then reaccelerate to return to operating speed. Because false alarms may occur relatively frequently, drivers may become complacent to such alarms and eventually begin ignoring the alarms. During high speed situations, such as two haul trucks merging onto a common road, it may not always be apparent if a collision is, in fact, impending. The size and shape of a typical haul truck limits visibility and often creates blind spots where an operator may not know exactly where parts of the vehicle are relative to the other vehicle merging. Though some haul trucks are equipped with systems to provide warnings, these are often reactive systems, where an audible or visible alert warns a driver of an impending collision. In these cases, one or both drivers of haul trucks may apply the brakes or stop the vehicle unnecessarily, causing delays and increasing operating costs. In some cases, a better alternative would be an evasive lateral maneuver by one or more drivers to avoid contact.

Typically, rotating equipment such as shovels are not equipped with systems that utilize dynamic positional or spatial data to provide feedback to haul truck operators when positioning for loading, such as vehicles 150, 165 in FIG. 1. Visual cues, such as a beacon 160 that are located outside the vehicle and may not always be visible to drivers due to poor sight lines on large haul trucks. Furthermore, as a truck is maneuvering into a first loading location, a shovel may be simultaneously engaged in loading a truck in a second loading location. In situations such as this, haul truck drivers may be engaged in multiple dynamic situations with varying levels of uncertainty: attending to the haul truck path into the loading zone, monitoring the position of the shovel as it loads the other truck, monitoring haul truck speed and direction, and positioning the truck to receive a load from the shovel, among other things. The system of the current disclosure aims to reduce uncertainty and mitigate potential for contention conditions (which may, in some cases include potential collisions or contact) between haul trucks, shovels, and other equipment in the mine by providing clear feedback regarding the dynamic spatial location of the vehicles.

In the current disclosure, a partial or projected zone overlap system uses the current position and movement data of a vehicle, as well as knowledge of the previous state of the vehicle, to generate a spatial zone that the vehicle is likely to inhabit with a particular timeframe. The system also uses the most recent positions received from nearby vehicles and their previous state to generate similar zones for those respective vehicles. If these projected zones overlap, even partially, an alert may be presented to one or more of the vehicle operators. The recent position and previous vehicle states may be determined by a system of devices located on haul trucks or other vehicles or within the mining environment itself, as described herein. The present projected zones may be calculated for any vehicles operating within the mining environment, including wheeled or tracked vehicles or vehicles (or other machinery) configured primarily to rotate or otherwise maneuver within the mining environment.

In some embodiments, each mine haul truck 205a-c may be equipped with an array of navigation, communication, and data gathering equipment that assist the haul truck's operator. Each mine haul truck is equipped with a mobile computing device, for example, a tablet personal computer, a personal digital assistant, or a "smart phone" for implementing the present system. The mobile computing device includes the basic functionality common to all computing devices, specifically, data processing, storage, input and output devices like displays, speakers and either dedicated or on-screen keyboards, and network communications interfaces.

The vehicles may include sensors or receivers (e.g., Global Positioning System (GPS) receivers, Global Navigation Satellite System (GNSS) receivers) that generate information about the time-varying position, orientation, and speed of the vehicles. The position and velocity sensors may receive data from a geolocation receiver that generates information about the time-varying position of the vehicles based upon transmissions from transmitters located terrestrially within the mining environment. Gyroscopes or other inertial navigation systems may also be used to locate the haul truck within the mine environment.

Each mine haul truck's mobile computing device may be configured to receive data from a Global Positioning System receiver, which generates information about the time-varying position of the truck. Additionally, or alternatively, each mine truck's mobile computing unit receives data from a geolocation receiver, which generates information about the time-varying position of the truck based on transmissions from transmitters located terrestrially, within the mining environment. The mobile computing device may also communicate with on-board sensors such as gyroscopes or inertial navigation systems for locating the haul truck within the mine environment.

The mine may include a communications network allowing computer systems on each vehicle to communicate with one another as well as with a centralized dispatch or control system located at central site 235. Each mine haul truck's mobile computing device operates in communication with a transceiver, which exchanges data directly with other mine haul trucks and with a mine communications network 230a, 230b, and 240. The communications network is represented as a collection of wireless data transceivers (e.g., transceivers 230a, 230b, and 240), such as would be suitable in implementing a WiFi, WiMax, GPRS, EDGE or equivalent wireless network. These network architecture examples are not limiting.

In practice, a mine communications network is typically an ad-hoc network consisting of various wired and wireless portions. The distances over which communications may occur in a mining environment, combined with the challenging and ever-changing topography of a mine, often prevent using strictly WiFi transceivers. The wireless portions of a mine communications network may not always be implemented using contemporary standards, and may include slower legacy systems. In certain embodiments, the requirement for a mine communications network is that it allow for, at least, the sharing of data between a central mine management computer located at a central site 235, with a plurality of mine haul trucks 205a-c. In other embodiments, transceivers located at the mine haul trucks 205a-c may act as network peers and may share information with one another directly, without the need to be in direct communication with a wider mine communications network or central site 235.

In the example embodiment of FIG. 2, power shovel 227 has a mobile computing device in communication with the communications network over a transceiver located at shovel site 225. The mobile computing device, which performs functions similar to those described previously in relation the mine haul trucks, may be adapted to communicate the position of the power shovel 227 to a central mine management application or other vehicles such as mine trucks 205a-c throughout the mine.

Figure 3:
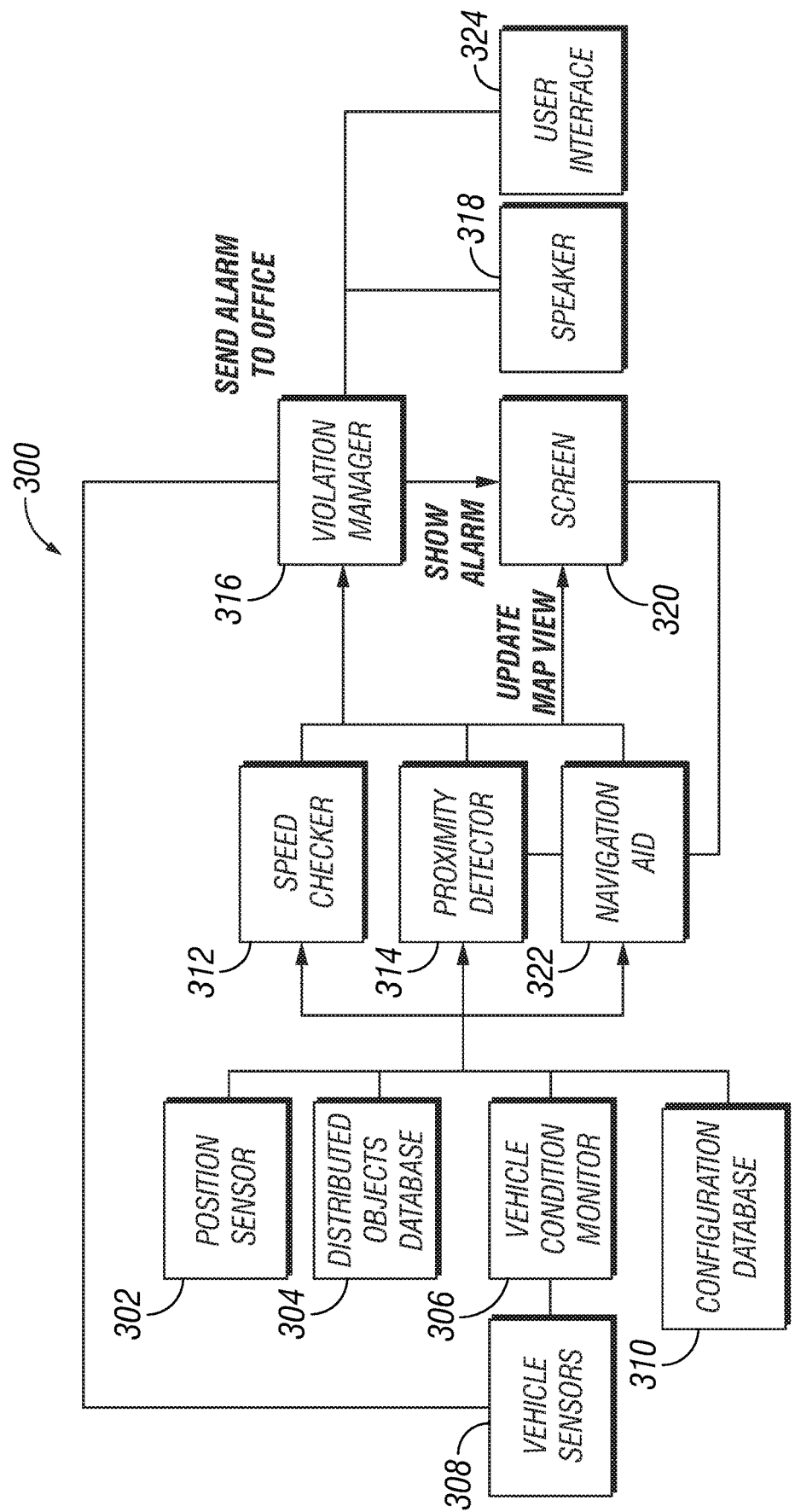
FIG. 3 is a block diagram depicting a navigation system that may be at least partially implemented within a mining vehicle.

FIG. 3 is a diagram illustrating functional components of an example system for aiding in the maneuvering of a vehicle in a mining environment. The depicted navigation system includes or has access to a number of sensors, databases (either locally accessible or accessed via a wireless electronic communications network), and processing elements. One or more components of the navigation system may be mounted within the vehicle. In various implementations, though, one or more of the systems (e.g., the various databases) may be installed at a central location of the mine where they may be updated and monitored by a central computing system. Generally, the components of the system shown in FIG. 3 may be installed directly into the heavy equipment vehicle and in direct communication with one another, or, if configured at a location away from the vehicle, the components are in wireless communication with the vehicle and components mounted therein.

In FIG. 3 system 300 includes a position sensor 302. The position sensor 302 detects the position of the vehicle, for example, by triangulating the vehicle's position in relation to fixed satellites, such as is known in GPS related art. The position sensor 302 might also determine the position of the vehicle by other means such as by triangulating the vehicle's position in relation to terrestrial transmitters located in a mining environment. In certain embodiments, WiFi or WiMax network transceivers with fixed, known positions may be used to provide terrestrial points of reference. The position sensor 302 optionally may use a combination of methods or systems to determine position, for example, by determining a rough position using GPS and performing error correction by terrestrial references, such as broadcasting beacons mounted in and around the mining environment or other terrestrial reference points. In alternative embodiments, position sensor 302 also takes data from conventional RFID, RADAR, optical or other proximity or collision warning systems. Position sensor 302 also includes one or more systems for determining an orientation of the vehicle. In some cases, orientation may be determined by an electronically-readable compass or other systems that uses the earth's magnetic poles to determine orientation. In other cases, the vehicle's orientation may be sensed using one or more terrestrial beacons or devices mounted in and around the mining environment. In other cases, the vehicle's orientation may be determined algorithmically, for example by tracking a movement of the vehicle over time, sensor 302 may make an accurate determination of the vehicle's orientation.

In some embodiments, position sensor 302 may be assisted by a number of external devices that are mounted around various objects in the mining environment to assist in determining a location and an orientation of the vehicle. For example, a number of radar, LIDAR, laser, or other object-detection systems could be installed at the entrance to a crusher bay or other equipment disposed around the mining environment. These externally-mounted systems may be mounted on any vehicles within the mining environment (e.g., shovels, haul trucks, pick-up trucks, etc.). The externally-mounted systems allow for peer-to-peer aggregation of vehicle positional data within the mining environment allowing for more accurate information that may be acquired from sensors mounted on a single vehicle.

System 300 may include a number of databases storing vehicle, spatial, or positional information. Distributed objects database 304 may store a listing of vehicles that are present within the mining environment. For each vehicle, distributed objects database 304 may store, in addition to the location information for each vehicle, additional descriptive information that identifies characteristics of the vehicle. For example, the database may store information describing the type of vehicle, its size (e.g., a description of the outer perimeter or profile of the vehicle) and capacity, its current status (e.g., loaded or unloaded, in use or not in use, etc.), weight, and velocity. For each vehicle, the database may also store information describing the operator of the vehicle (e.g., the operator's experience level, current assignment, shift status, etc.).

In some cases, the vehicles defined within distributed objects database 304 vary over time. Because the mining environment is constantly being modified by the mining operations, nearly all objects within distributed objects database 304 may change over time. Accordingly, to ensure that database 304 contains up-to-date information, the contents may be periodically refreshed via a connection to a central computer system that monitors the position and status of vehicles within the mine environment. Whether distributed objects database 304 is based in the vehicle, a central computer system, or a combination of both, distributed objects database 304 may be configured to be constantly updated. Updates to distributed objects database 304 are distributed efficiently and the database reflects the known objects within the mining environment at any point in time.

Some embodiments may include system 300 which includes vehicle condition monitor 306. Vehicle condition monitor 306 is configured to monitor one or more systems within the vehicle and determine a current status or condition of those systems. In some cases, vehicle condition monitor 306 communicates with one or more vehicle sensor 308 mounted in and around the vehicle to determine the current status of those systems. For example, vehicle condition monitor 306 may monitor a current status of the vehicle's fuel level or fuel status, wheel positions (e.g., in two-wheel or four-wheel configurations, the angle of the wheels may be measured), current selected gear (e.g., forward or backward gears), braking status, etc. Vehicle condition monitor 306 may also determine whether the vehicle is carrying a load or whether the vehicle is empty. Vehicle condition monitor 306 may also track a current speed of the vehicle. When the vehicle includes sensors for monitoring a health level of various components of the vehicle (e.g., engine temperature, tire pressure, battery charge levels), vehicle condition monitor 306 may also communicate with those sensors to identify the current status of the connected systems.

The system 300 may include a number of modules (e.g., which may be implemented at least partially in a remote application) that act on data received from one or more of position sensor 302, distributed objects database 304, vehicle condition monitor 306, and configuration database 310. The system 300 includes navigation aid 322 that is configured to one or more of position sensor 302, distributed objects database 304, vehicle condition monitor 306, and configuration database 310 to assist an operator of the vehicle in maneuvering about the mining environment. To begin a navigation maneuver, navigation aid 322 may be configured to access position sensor 302 and distributed objects database 304 to identify a listing of potential target destinations.

System 300 may also include a user messaging function to alert the vehicle operator of messages, such as instant messages or electronic mail, relayed to system 300 from a central application not shown. When a user receives a message, audible alarms may be sent to speaker 318 and visual alarms as well as a display of the message itself may be sent to screen 320. In some embodiments, system 300 may include a driver vehicle interface that provides a user interface 324 (e.g., a display screen with touch screen functionality) enabling a vehicle driver to receive data from the vehicle and, in some embodiments, provide feedback to the user interface 324, such as through a touch screen display or voice control system. The functionality of screen 320 and user interface 324, therefore, may be combined into a single functional component of system 300.

System 300 may also optionally include a data storage module that is updated from a central application. For example, system 300 may include a database or other data storage system that stores roadmap data, overhead imaging data, or time varying data on a remote vehicle's position and/or condition. The database may be periodically updated by the central application (not shown), through a data synchronizer.

System 300 along with any necessary data storage and communications hardware may be included in a variety of known devices, for example, handheld personal data assistants (PDAs), laptop computers, or "smart" cellular telephones. In embodiments, one or more components of system 300 may be distributed so that different functionality of system 300 may be implemented by one or more processors operating in one or more locations. In some embodiments, for example, the functionality implemented by components of system 300, such as distributed objects database 304, configuration database 310, and violation manager 316, may be implemented within a cloud-based computing environment. A cloud-based computing environment generally refers to a network accessible platform implemented as a computing infrastructure of processors, storage, software, data access, and so forth that is maintained and accessible via a network such as the Internet. Cloud services do not require end-user knowledge of the physical location and configuration of the system that delivers the services. Common expressions associated with cloud services include "on-demand computing", "software as a service (SaaS)", "platform computing", "network accessible platform", and so forth.

Figure 4:
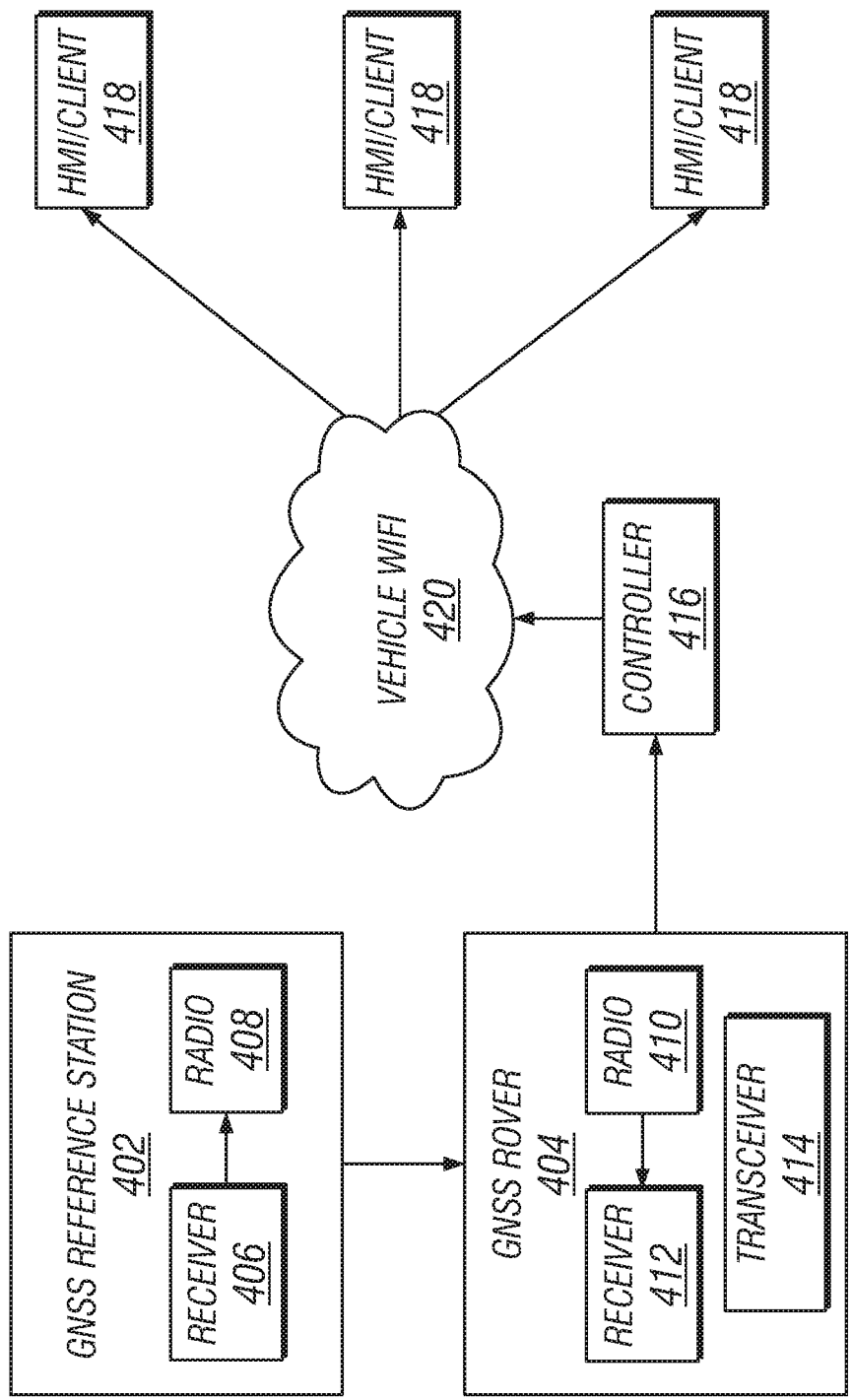
FIG. 4 is a block diagram depicting components of an example navigation system and the mechanism by which they communicate with one another.

In some embodiments, the present system may additionally utilize a combination of one or more (GNSS) reference stations or reference rovers to provide accurate location data for one or more vehicles within a particular environment, such as a mining environment. In FIG. 4, GNSS reference station 402 includes receiver 406 configured to receive one or more externally-generated signal (e.g., a radio frequency (RF) signal) providing GNSS reference station 402 with its location data. GNSS reference station 402 also include radio 408 configured to broadcast the location information for GNSS reference station 402 using a known protocol. This enables GNSS reference station 402 to operate as a beacon, continuous broadcasting its own well-known location data.

GNSS rover 404 includes radio 410 and receiver 412 configured to receive and decode the beacon signals of one or more GNSS reference station 402 positioned about the environment. GNSS rover 404 may then analyze one or more of the beacon signals received via radio 410 to determine an accurate location and orientation of GNSS rover 404.

In various embodiments, GNSS rover 404 may be mounted to a vehicle (e.g., a haul truck or shovel within a mine environment) so that once an accurate position and orientation are determined for GNSS rover 404, the position and orientation of the vehicle may be determined.

GNSS rover 404 includes transceiver 414. Transceiver 414 is configured to communicate (via both transmission and reception) data with one or more components that may be mounted to the vehicle. In one embodiment, transceiver 414 may be configured to implement a relatively low-power short range communication protocol, such as BLUETOOTH. But in other embodiments, any suitable data communication protocol or technology, including both wired and wireless approaches, may be utilized.

Using transceiver 414, GNSS rover 404 is configured to transmit its location data to controller 416, which is also located on or in the vehicle. In various embodiments, controller 416 may be a mobile computing device, such as a laptop or tablet device. Controller 416 may be configured to receive the location data from GNSS rover 404, as well as location data from a number of different sources including ultra-wide band transmission, RADAR devices, LiDAR, system 300, or other systems. Controller 416 is then configured to accumulate all data received to determine a location of the vehicle. This may involve, for example, combining some of the positional data together to determine the location. In some cases, some of the location data may be ignored and only utilized if one or more of the other location determining systems should fail or be unavailable.

In alternative embodiments, however, absolute position of the vehicle may not be required. Instead, systems like ultra-wide band, RADAR and LiDAR may give accurate relative position data (e.g., with respect to a target destination), not absolute global positions. Controller 416 may also be configured to access one or more databases storing positional and other attribute data for a number of entities within the environment. An example of such a database includes distributed objects database 304, described above. The determination of vehicle position may be an ongoing process, and the controller may store previous vehicle state variables (such as position, speed, bearing, yaw, or others) in memory. The controller 416 may use the modules described above to communicate data regarding the position and previous state of the vehicle to other nearby equipment through Basic Safety Messages (BSM).

The partial projected zone overlap system may be implemented for each vehicle or piece of equipment (shovels, etc.) that operate within a mine. A controller (e.g., a processor implemented within controller 416, navigation aid 322, violation manager 316, or the like) on a haul truck or in a distributed computing device or remote computer server may generate or calculate a bounding box that may be displayed on a screen in the vehicle. The bounding box may be a rectangle or other shape that encompasses the entire vehicle body. In some embodiments, the controller 416 may access distributed objects database 304 to retrieve attributes of the vehicle, such as length or width of the vehicle, and display the bounding box on a display device that may include a map of the mining environment.

Figure 5:
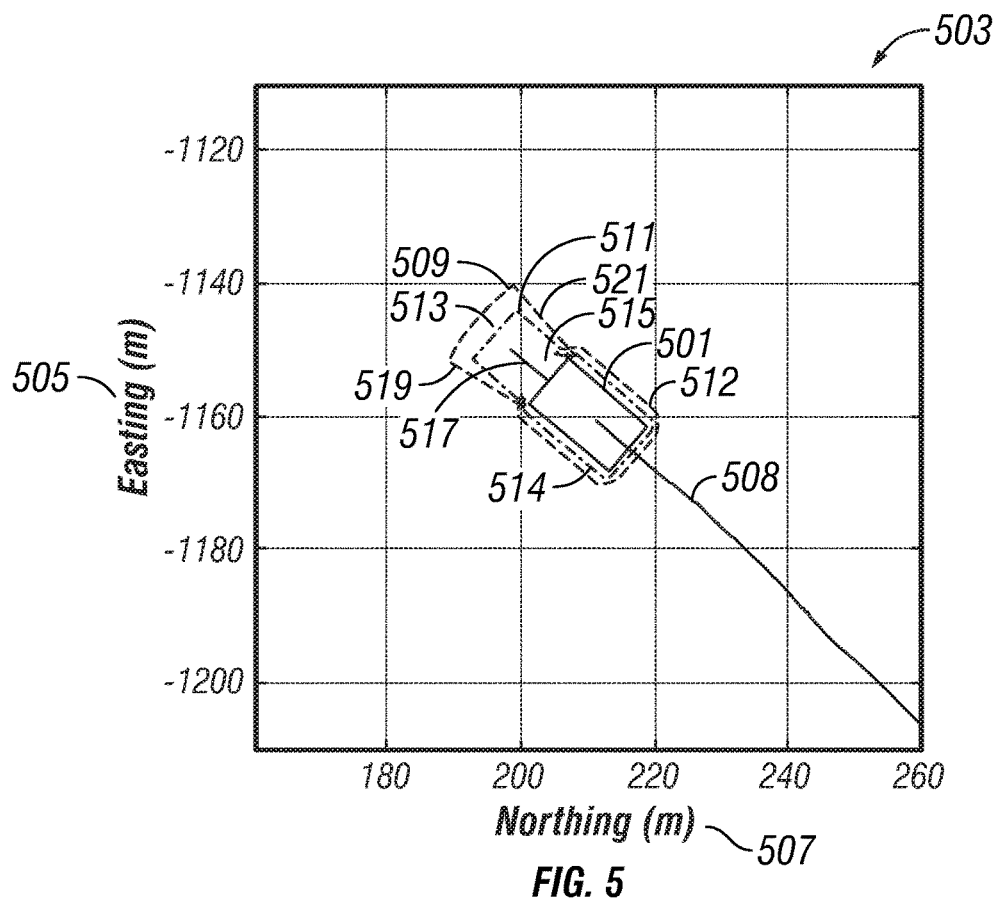
FIG. 5 depicts an example embodiment of a haul truck that includes projected zones depicted for the haul truck.

FIG. 5 shows an example embodiment of a bounding box 501 representing a mine haul truck that may be depicted on a display device in the vehicle. The bounding box 501 is depicted in an example map 503 of a mining environment, with easting 505 and northing 507 headings provided for orientation. A line 508 on the map depicts previous locations of a center point of the vehicle in the mine. Surrounding the bounding box are two projected zones that are determined using a number of current and stored values related to the vehicle's position and movement. Inform zone 509 is an outer area and warning zone 511 is an inner area, and represent the surrounding space at different distances from the vehicle, and serve as two different levels of "buffer space" around a vehicle.

Each zone may be a combination of two separate subzones. Inform zone 509 and warning zone 511 and may comprise first subzones 512 and 514, respectively, that encompass an area directly surrounding the bounding box 501. In some embodiments this may be a static, fixed distance beyond the bounding box, or may be a dynamic zone that changes as the vehicle moves. Inform zone 509 and warning zone 511 and may also comprise second subzones 513 and 515, respectively that represent an area of space where the vehicle may occupy soon, based on the current and past position of the vehicle and information about the vehicle's movement. Subzones 513 and 515 project in the direction of movement of the vehicle, and can be computed using a number of variables.

Typically, a controller (e.g., controller 416 or navigation aid 322) may receive a current position of the vehicle (such as GNSS data, as described previously) as well as previous position data that may be stored in a memory accessible to the controller. When the controller accesses previous positional data, each latitude and longitude measurement stored in memory may also include a timestamp indicating when the measurement was recorded. The system controller forms a sequence of positional data points indicating the geolocation (latitude and longitude) of the vehicle over a period of time. The sequence of positional data points may be used to generate a historical path of travel of the vehicle that can be used to predict a future path of travel of the vehicle. In order to place the path of travel into the context of a map (e.g., map 503) of the mining environment, the position data may undergo a flat-earth transform, wherein the latitude and longitude values from the GNSS are converted to a 2D projection of coordinates in a unit of distance, such as meters. In some embodiments, the coordinates may be "mine coordinates," which are relative to a common origin that is used throughout the mine. In other embodiments, the coordinates may be relative to nearby vehicles, equipment, a general area of the mine where a vehicles is located, or other mine landmarks.

The controller uses the previous position data to create a vector of the path of travel of the vehicle, such as line 517 in FIG. 5. The vector may comprise easting and northing components that describe the position of the vehicle in the x-y plane. Controller 416 may calculate easting and northing velocities by computing the change in position, as measured in the units of distance from the flat-earth transform, over time as measured by the timestamps of the position measurements. The controller may use the velocity vectors to estimate the current and previous bearing, or direction of movement, of the vehicle. The controller 416 may also compute the yaw angle, which is the difference between the current and previous bearings. In some cases, the bearing of a vehicle may not be in alignment with the vehicle heading, or direction the front of the vehicle is facing.

An exaggerated example of this may occur if a vehicle is slipping laterally on ice, in which case a sideways (e.g., leftward) bearing is perpendicular to a forward heading. The controller 416 may access the vehicle heading from position sensors 302 in system 300. Mine haul trucks typically have a number of position sensors 302 which may include antennas, gyroscopes, or similar sensors. In a typical embodiment, large mining vehicles such as haul trucks may have two antennas placed in a known configuration on the vehicle. The heading is determined by computing a vector between antennas relative to the coordinate system. Because the position of the sensors on the vehicle is known, the relationship between the straight-line formed by the line between the sensors and the front face of the vehicle can be used to compute the heading of the vehicle. The controller compares the vehicle heading to vehicle bearing to more accurately depict the zones about the vehicle. For example, if the bearing and heading oppose one another, the controller may determine the vehicle is travelling in reverse. Inherent in nearly all electronic devices is electronic noise, which can affect the precision of measurements. Noise may arise in GNSS receivers, transceivers, or other electronic devices or be imparted by other means such as mechanical interference. To overcome noise and reduce error in the estimate of the velocity, bearing, yaw, and heading estimates, positional data may undergo exponential smoothing. In other embodiments, different algorithms for smoothing the vectors may also be used.

Once the values of current and previous easting, northing, easting speed, northing speed, bearing, and heading measurements, as well as the timestamps of the measurements are known, the system can compute inform zone 509 and warning zone 511. Zones 509, 511 may be dynamically updated depending on the position and movement measurements of the vehicle. Subzones 513, 515 emanate from the bounding box 401 and project in the direction the vehicle is moving, and may change size and shape to reflect the current position, speed, bearing, and yaw. The length the zones extend beyond the bounding box 401 reflect the stopping distance of the vehicle accounting for, optionally, a typical driver reaction time. Subzone 513 is calculated to be a more conservative estimate. Line 517 represents the stopping distance of the vehicle, i.e.: the distance the vehicle would travel after the brakes were applied. In some embodiments, controller 416 may access vehicle condition monitor 306 in system 300 to retrieve certain attributes of the vehicle to make these calculations, such as tire pressure, vehicle speed, vehicle weight, or others. For example, a haul truck with a full load may have a longer stopping distance than an empty truck, and the controller may adjust line 517 and subzones 513, 515, accordingly. In some embodiments, the controller may adjust subzone 513 depending on the yaw angle. For example, lines 519, 521 are positioned at an outward angle, relative to the bounding box, that follows the yaw of the vehicle in motion.

Figure 6:
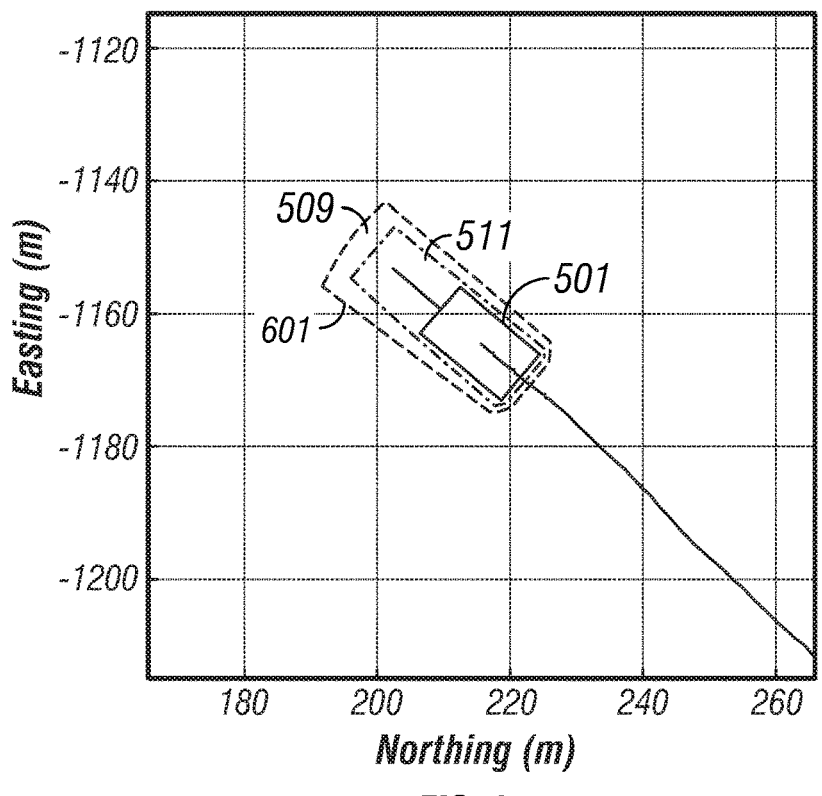
FIG. 6 depicts an alternative example embodiment of a haul truck with a projected zone overlap system enabled.

In some embodiments, subzones may be joined together to form a larger vehicle inform zone 509 and warning zone 511 as seen in FIG. 6. In FIG. 6, the haul truck represented by bounding box 501 is making a slight turn to the left. Controller 416 has compensated for this by adjusting the position of inform zone 509 relative to the bounding box by adjusting for the yaw angle and bearing of the vehicle. A portion 601 of inform zone 509 has been extended toward the front left of the vehicle to represent the projected location of the vehicle in the future.

Figure 11A:
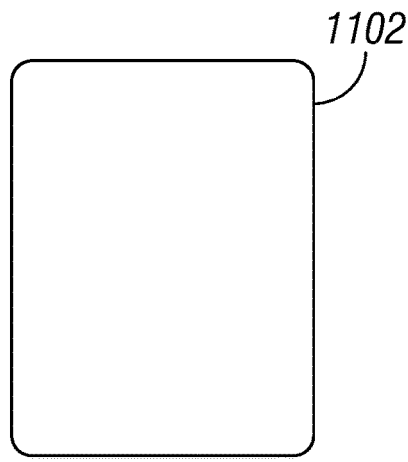
FIGS. 11A-11G are a sequence of diagrams depicting an approach for generating projected zone depictions for a moving vehicle.

FIGS. 11A-11G depict a sequence of steps for determining a projected zone about a moving vehicle. Typically, the method is implemented within a two-dimensional representation of the mining environment. In a preliminary step, a location and orientation of the vehicle (e.g., a haul truck in a mining environment) is determined. The location and orientation may be determined based upon data received from location sensors mounted to the vehicle. The location and orientation can be determined using any of the approaches and technologies described herein. With the location and heading determined, as depicted in FIG. 11A, a bounding box 1102 can be established for the vehicle. Bounding box 1102 generally has the same dimensions as the vehicle and is established with the same orientation as the vehicle. Data describing the geometry of bounding box 1102 could, for example, be stored within distributed objects database 304 of system 300, or in another suitable data repository. Bounding box 1102 therefore is a representation of the location and orientation of the vehicle within the mining environment, where the bounding box 1102 is associated with coordinates corresponding to actual location of the vehicle.

Figure 11B:
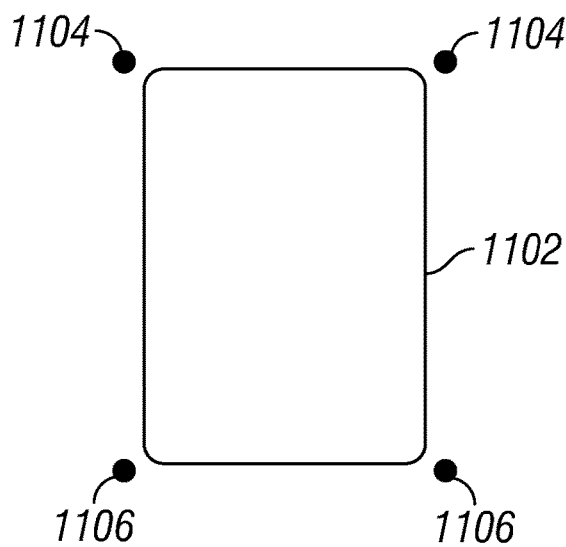

In FIG. 11B, a number of boundary points are positioned about bounding box 1102. Boundary points 1104 are positioned at the front of the vehicle (in this example, the vehicle is moving upwards when viewing the figures) and boundary points 1106 are positioned at the rear of the vehicle. Front boundary points 1104 and positioned proximate the front right and left corners of bounding box 1102. Because bounding box 1102 generally follows the precise geometry or shape of the vehicle, bounding box 1102 does not provide any buffer space around the vehicle. Accordingly, as shown in FIG. 11B, bounding points 1104 and 1106 are offset from the vehicle to establish a boundary about bounding box 1102 and, ultimately, the vehicle, as described herein. Each of the bounding points 1104 and 1006 may be positioned by identifying a corner of bounding box 1102 and locating the bounding points a distance away from bounding box 1102 (e.g., offset away from bounding box 1102 by a particular distance both laterally and longitudinally away from bounding box 1102). In an embodiment, boundary points 1104 are offset laterally from the vehicle (i.e., bounding box 1102) by approximately 2 meters and boundary points 1106 are offset both laterally and longitudinally from the vehicle (i.e., bounding box 1102) by approximately 2 meters, though different offsets may be utilized.

Figure 11C:
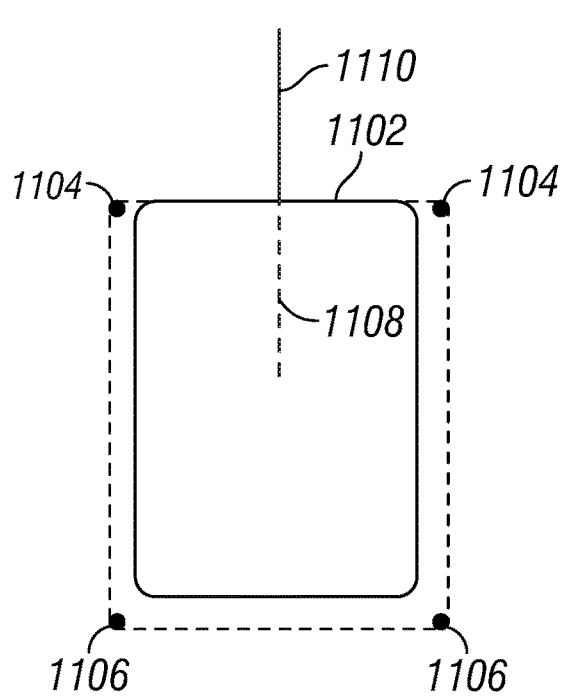

Having established the locations of boundary points 1104 and 1106, historical location data from the vehicle is analyzed to determine a current speed and future course of travel of the vehicle. With reference to FIG. 11C, line 1108 represents the historical travel path of the vehicle mapped onto bounding box 1102. The future path of travel may be determined by analyzing historical location data received from a location sensor on the vehicle. Based upon the historical path of travel indicated by line 1108, an anticipated movement of the vehicle (referred to in this example as a future path of travel) indicated by line 1110 is predicted. When determining the future path of travel, a smoothing algorithm can be applied to the historical location data to estimate the current bearing and the rate of change of that bearing which along with speed determines the turn radius. The future path is then estimated to be along the same direction and turn as the historical path for a distance determined by the estimated stopping distance. The path of future or anticipated travel 1110 presumes no change in steering input to the vehicle and simply assumes that the vehicle will travel along the same path as set out by line 1108. The length of the line depicting the future travel path 1110 is equal to the stopping distance of the vehicle at its current speed. Data describing the stopping distance for the vehicle at various speeds (or data necessary to calculate the stopping distance for a given speed) could, for example, be stored within distributed objects database 304 of system 300, or in another suitable data repository.

Figure 11D:
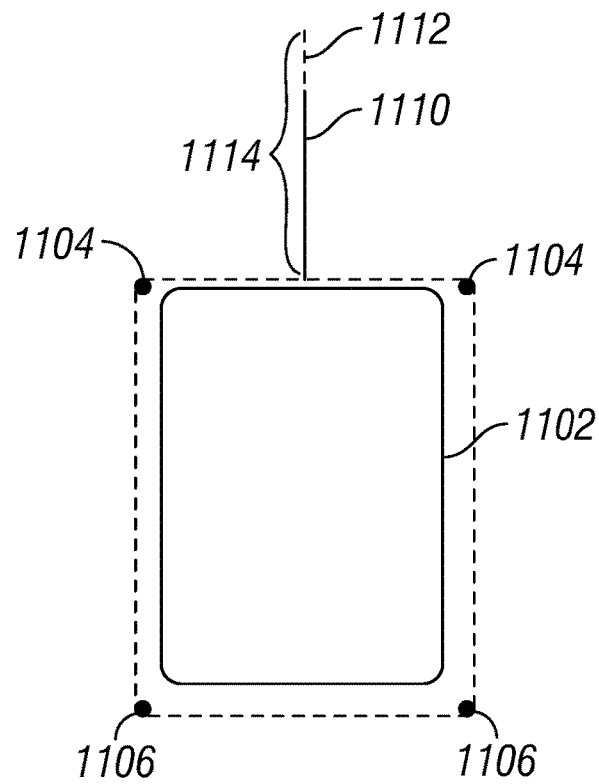

In FIG. 11D the line specifying the path of future travel 1110, which has a length equal to the stopping distance of the vehicle at its current speed, is extended by an amount 1112 to account for a driver's reaction time. Data describing a typical reaction time for the driver of the vehicle at various speeds (or data necessary to calculate the stopping distance for a given speed) could, for example, be stored within distributed objects database 304 of system 300, or in another suitable data repository. The additional amount 1112 to extend the anticipated path of travel may be calculated by multiplying the current speed of the vehicle (as determined by location sensors on the vehicle) by the typical reaction time. Accordingly, line 1114 (equal to the combination of lines 1110 and 1112) represents the path of the vehicle should the vehicle operator initiate a stop accounting for the operator's typical reaction time.

Figure 11E:
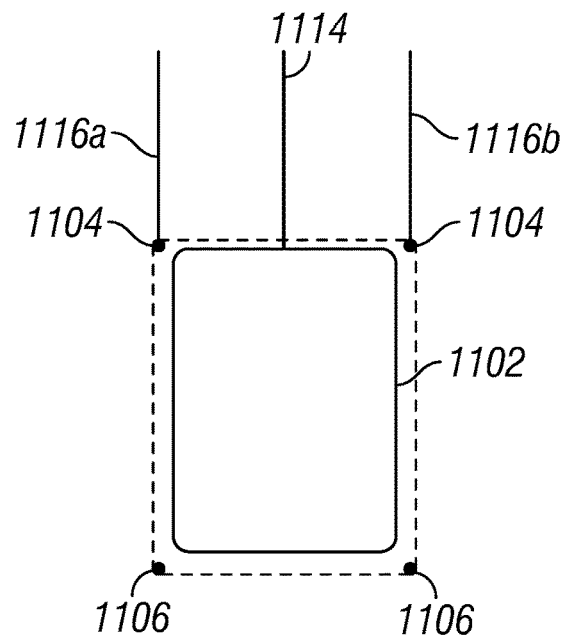

In FIG. 11E, lines 1116a and 1116b are extended from each of the front boundary points 1104 and each have the same orientation and length as line 1114 (i.e., lines 1116a and 1116b are parallel to line 1114) representing the stopping distance for the vehicle. Lines 1116a and 1116b, therefore, describe the path of the edges of the vehicle (plus the buffer provided by the placement of boundary points 1104) should the vehicle be stopped by the vehicle's operator within the defined stopping distance (plus the operator's reaction time) while continuing along its current trajectory.

Figure 11F:
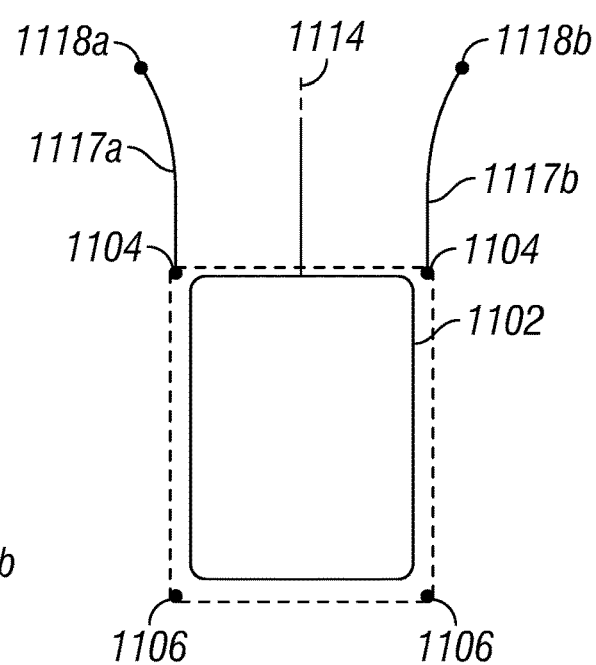

Because there can be some degree of uncertainty in the vehicle's future path of travel —particularly during a stopping activity, FIG. 11F depicts lines 1116a and 1116b being adjusted to account for some uncertainty in the future position of the vehicle. As such, line 1116a on the left side of the vehicle is modified to presume that the vehicle will, to some degree, turn to the left from its current path of travel. In an embodiment, the modification to line 1116a may be made by first determining a current yaw rate of the vehicle (in the example of FIGS. 11A-11G, the vehicle is not turning and is driving in a straight line, so the vehicle's yaw rate is zero). The vehicle's current yaw may be determined by accessing one or more vehicle controllers or data sensors in the vehicle. Then, line 1116a is redrawn to form line 1117a to predict the vehicle's path presuming a reduced (in this case, negative) yaw rate and a corresponding direction of travel. In another embodiment, line 1116a may be rotated in a first direction (i.e., counter-clockwise when viewing bounding box 1102 from a top perspective), such as 5 degrees or 10 degrees, about point 1104 from which line 1116a is drawn to form line 1117a. Conversely, line 1116b on the right side of the vehicle is modified to presume that the vehicle will, to some degree, turn to the right. In an embodiment, the modification to line 1116b may be made by first determining a current yaw rate of the vehicle (in the example of FIGS. 11A-11G, the vehicle is not turning and is driving in a straight line, so the vehicle's yaw rate is zero). Then, line 1116b is redrawn to form line 1117b to predict the vehicle's path presuming an increased (in this case, positive) yaw rate and a corresponding direction of travel. In FIG. 11F, modified lines 1116a and 1116b are labeled 1117a and 1117b, respectively. In another embodiment, line 1116b may be rotated in a second direction (i.e., clockwise when viewing bounding box 1102 from a top perspective), such as 5 degrees or 10 degrees, about point 1104 from which line 1116b is drawn to form line 1117b. Points 1118a and 1118b are defined at the ends of lines 1117a and 1117b furthest away from bounding box 1102, respectively.

Figure 11G:
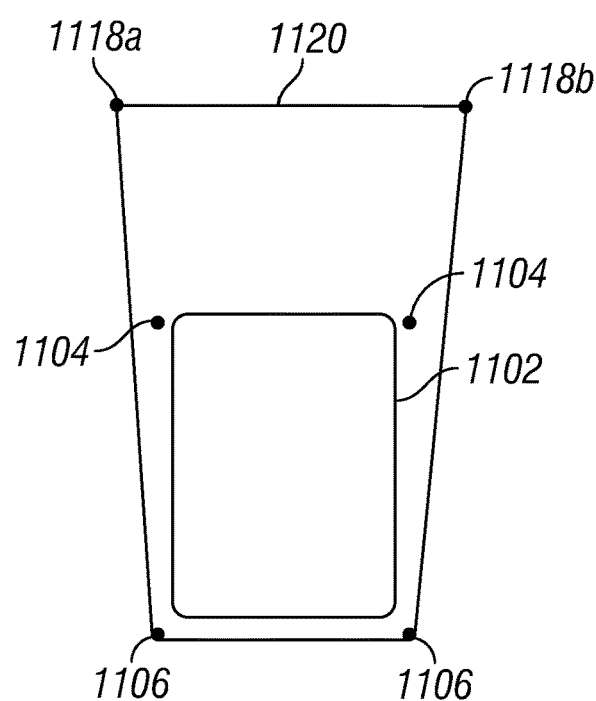

In FIG. 11G, a convex hull 1120 is drawn about points 1118a, 1118b, 1104, and 1106. In this embodiment, convex hull 1120 is generally defined as a shape that is the smallest convex shape that contains all of points 1118a, 1118b, 1104, and 1106 as well as lines 1117a and 1117b. Convex hull 1120 becomes the projected zone for the vehicle indicated by bounding box 1102.

Depending upon the system implementation, the algorithm depicted in FIGS. 11A-11G may be adjusted to generate one or more projected zones for a vehicle, where each projected zone may have different attributes. For example, a first inform zone (see, for example, inform zone 509 of FIG.

5) could be generated for a vehicle using this approach. Such an inform zone may have a longer stopping distance (e.g. line 1114), perhaps determined by the distance the vehicle would require to perform a non-emergency stop. The algorithm could then be implemented as discussed above to generate a relatively large inform zone for the vehicle. In a similar a manner, a warning zone could also be calculated for the vehicle (see, for example, warning zone 511 of FIG. 5) in which a minimum stopping distance is used (indicating an emergency stop). When generating a number of different zones for a vehicle, the position of boundary points 1104 and 1106 with respect to the vehicle's bounding box 1102 may also be adjusted.

Using the approach depicted in FIGS. 11A-11G, one or more zones may be generated for a moving vehicle. The project zones may be recalculated to continuously update the size and shape of the projected zones as the vehicles continues to move within the mining environment (or come to a stop). The zones may be re-calculated at a relatively high frequency (e.g., more often than every 5 seconds or every second) to ensure that the projected zones are accurate given the current state of the vehicle.

FIGS. 12A-12F depict a sequence of steps for determining a projected zone about a moving vehicle that is undergoing a turn. Typically, the method is implemented within a two-dimensional representation of the mining environment. In a preliminary step, a location and orientation of the vehicle (e.g., a haul truck in a mining environment) is determined. The location and orientation can be determined using any of the approaches and technologies described herein. With the location and heading determined, a bounding box 1202 can be established for the vehicle. Bounding box 1202 generally has the same dimensions as the vehicle and is established with the same orientation as the vehicle. Data describing the geometry of bounding box 1202 could, for example, be stored within distributed objects database 304 of system 300, or in another suitable data repository. Bounding box 1202 therefore is a representation of the location and orientation of the vehicle within the mining environment, where the bounding box 1202 is associated with coordinates corresponding to actual location of the vehicle.

Figure 12A:
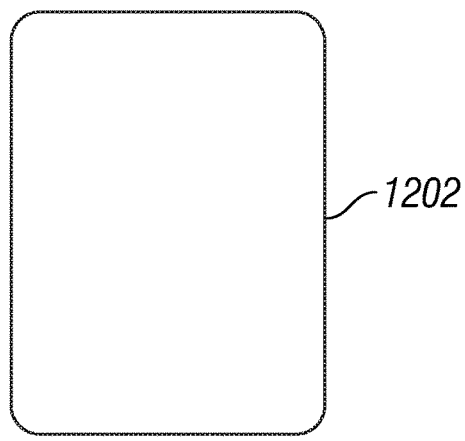
FIGS. 12A-12F are a sequence of diagrams depicting an approach for generating projected zone depictions for a moving vehicle that is undergoing a turn.
Figure 12B:
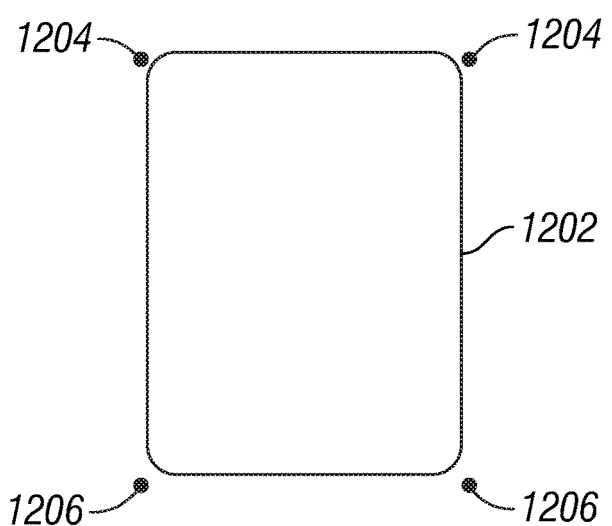

In FIG. 12B, a number of boundary points are positioned about bounding box 1202. Boundary points 1204 are positioned at the front of the vehicle (in this example, the vehicle is moving upwards when viewing the figures) and boundary points 1206 are positioned at the rear of the vehicle. Front boundary points 1204 and positioned proximate the front right and left corners of bounding box 1202. Because bounding box 1202 generally follows the precise geometry or shape of the vehicle, bounding box 1202 does not provide any buffer space around the vehicle. Accordingly, as shown in FIG. 12B, bounding points 1204 and 1206 are offset from the vehicle to establish a boundary about bounding box 1202 and, ultimately, the vehicle, as described herein. Each of the bounding points 1204 and 1206 may be positioned by identifying a corner of bounding box 1202 and locating the bounding points a distance away from bounding box 1202 (e.g., offset away from bounding box 1202 by a particular distance both laterally and longitudinally away from bounding box 1202). In an embodiment, boundary points 1204 are offset laterally from the vehicle (i.e., bounding box 1202) by approximately 2 meters and boundary points 1206 are offset both laterally and longitudinally from the vehicle by approximately 2 meters, though different offsets may be utilized.

Figure 12C:
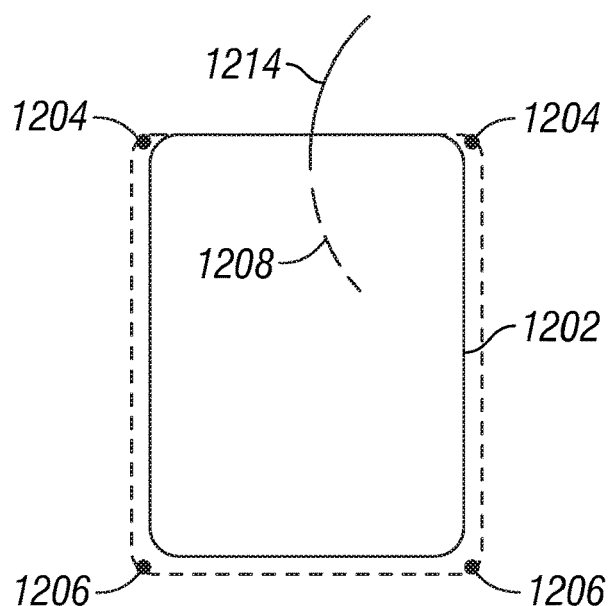

Having established the locations of boundary points 1204 and 1206, historical location data from the vehicle is analyzed to determine a current speed and future course of travel of the vehicle. With reference to FIG. 12C, dashed line 1208 represents the historical travel path of the vehicle mapped onto bounding box 1202. Based upon the historical path of travel 1208, a future path of travel 1214 is predicted. The future path of travel may be determined by analyzing historical location data received from a location sensor on the vehicle. The path of future travel 1214 presumes no change in steering input to the vehicle and simply assumes that the vehicle will travel along the same path as set out by line 1208. When determining the future path of travel, a smoothing algorithm can be applied to the historical location data to estimate the current bearing and the rate of change of that bearing which along with speed determines the turn radius. The future path is then estimated to be along the same direction and turn as the historical path for a distance determined by the estimated stopping distance.

The length of the line depicting the future travel path 1210 can be determined by the stopping distance of the vehicle, anticipated reaction time of the operator to the stop the vehicle, or any other suitable factors. Data describing the stopping distance for the vehicle at various speeds (or data necessary to calculate the stopping distance for a given speed) could, for example, be stored within distributed objects database 304 of system 300, or in another suitable data repository. Accordingly, line 1214 represents the path of the vehicle should the vehicle operator initiate a stop accounting for the operator's reaction time. Data describing a typical reaction time for the driver of the vehicle at various speeds (or data necessary to calculate the stopping distance for a given speed) could, for example, be stored within distributed objects database 304 of system 300, or in another suitable data repository.

Figure 12D:
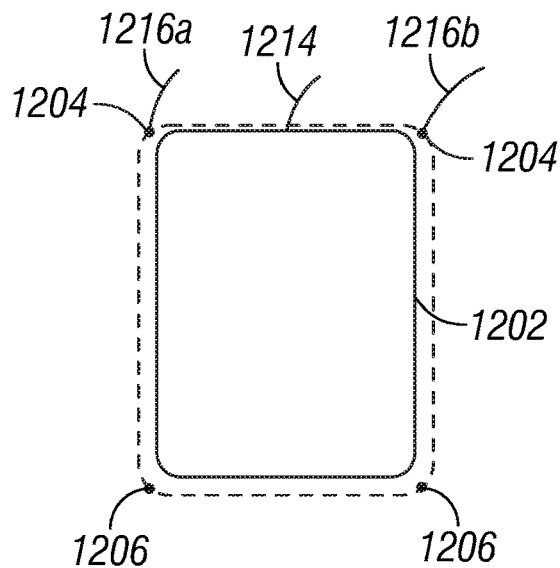

In FIG. 12D, lines 1216a and 1216b are extended from each of the front boundary points 1204 and each have the same length and orientation as line 1214 (i.e., lines 1216a and 1216b have the same curvature as line 1214) representing the stopping distance for the vehicle. Lines 1216a and 1216b, therefore, describe the path of the edges of the vehicle (plus the buffer provided by the placement of boundary points 1204) should the vehicle be stopped by the vehicle's operator within the defined stopping distance (plus the operator's reaction time). It should be noted that lines 1216 generally follow the same path (and therefore have the same curvature) as line 1214.

Figure 12E:
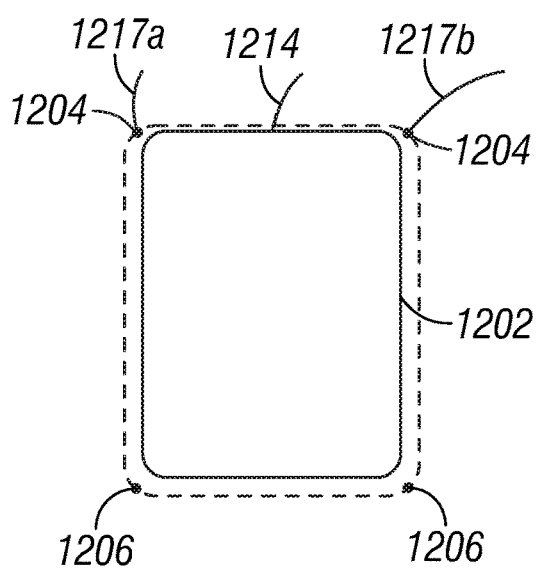

Because there can be some degree of uncertainty in the vehicle's future path of travel—particularly during a stopping activity, FIG. 12E depicts lines 1216a and 1216b being adjusted to account for some uncertainty in the future position of the vehicle. As such, line 1216a on the left side of the vehicle is modified to presume that the vehicle will, to some degree, turn more to the left from its current path of travel. In an embodiment, the modification to line 1216a may be made by first determining a current yaw rate of the vehicle. The vehicle's current yaw may be determined by accessing one or more vehicle controllers or data sensors in the vehicle. Then, line 1216a is redrawn to form line 1217a to predict the vehicle's path presuming a reduced yaw rate and a corresponding direction of travel. In another embodiment, line 1216a may be rotated in a first direction (i.e., counter-clockwise when viewing bounding box 1202 from a top perspective), such as 5 degrees or 10 degrees, about point 1204 from which line 1216a is drawn to form line 1217a. Conversely, line 1216b on the right side of the vehicle is modified to presume that the vehicle will, to some degree, turn more to the right. In an embodiment, the modification to line 1216*b* may be made by first determining a current yaw rate of the vehicle. Then, line 1216*b* is redrawn to form line 1217*b* to predict the vehicle's path presuming an increased yaw rate and a corresponding direction of travel. In FIG. 12E, modified lines 1216*a* and 1216*b* are labeled 1217*a* and 1217*b*, respectively. In another embodiment, line 1216*b* may be rotated in a second direction (i.e., clockwise when viewing bounding box 1202 from a top perspective), such as 5 degrees or 10 degrees, about point 1204 from which line 1216*b* is drawn to form line 1217*b*. Points 1218*a* and 1218*b* are defined at the ends of lines 1217*a* and 1217*b* furthest away from bounding box 1202, respectively.

Figure 12F:
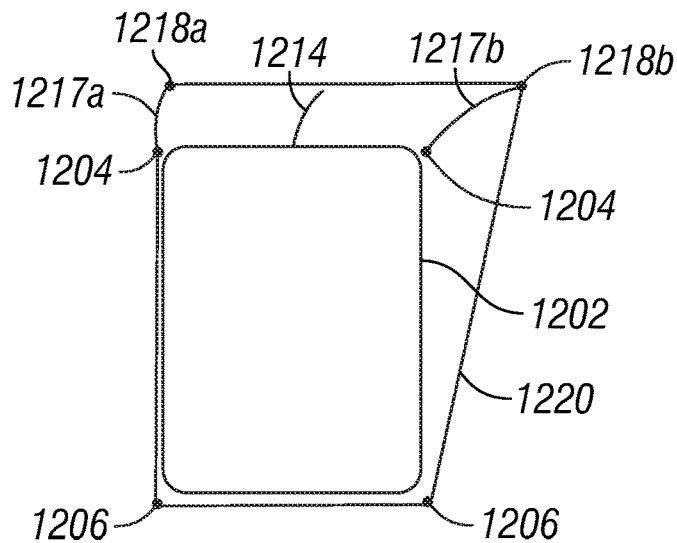

In FIG. 12F, a convex hull 1220 is drawn about points 1218*a*, 1218*b*, 1204, and 1206. Convex hull 1220 is generally defined as a shape that is the smallest convex shape that contains all of points 1218*a*, 1218*b*, 1204, and 1206 as well as lines 1217*a* and 1217*b*. In accordance with this definition, convex hull 1220 generally involves straight edges apart from the portion of convex hull that contains line 1217*a*. There, the convex hull 1220 incorporates the curvature of line 1217*a* so that convex hull 1220 can contain all of line 1217*a*, as described above. Convex hull 1220 becomes the projected zone for the vehicle indicated by bounding box 1202.

Depending upon the system implementation, the algorithm depicted in FIGS. 12A-12F may be adjusted to generate one or more projected zones for a vehicle, where each projected zone may have different attributes. For example, a first inform zone (see, for example, inform zone 509 of FIG. 5) could be generated for a vehicle using this approach. Such an inform zone may have a longer stopping distance (e.g. line 1214), perhaps determined by the distance the vehicle would require to perform a non-emergency stop. The algorithm could then be implemented as discussed above to generate a relatively large inform zone for the vehicle. In a similar a manner, a warning zone could also be calculated for the vehicle (see, for example, warning zone 511 of FIG. 5) in which a minimum stopping distance is used (indicating an emergency stop). When generating a number of different zones for a vehicle, the position of boundary points 1204 and 1206 with respect to the vehicle's bounding box 1202 may also be adjusted.

Using the approach depicted in FIGS. 12A-12F, one or more zones may be generated for a moving vehicle. The project zones may be recalculated to continuously update the size and shape of the projected zones as the vehicles continues to move within the mining environment (or come to a stop). The zones may be re-calculated at a relatively high frequency (e.g., more often than every 5 seconds or every second) to ensure that the projected zones are accurate given the current state of the vehicle.

In some embodiments, two vehicles in a mining environment may send BSMs to one another that communicate the data necessary to create zones for each vehicle. A controller in each vehicle may then generate a depiction of both vehicles and their surrounding zones relative to one another by the methods described above. For example in FIG. 7*a*, haul truck's represented by bounding boxes 701 and 703 are travelling generally toward one another. Inform zones 705 and 707 provide a projected zone indicating where the vehicles may be in the future relative to one another, using the current and previous position and movement data of the vehicles. As the trucks 701 and 703 travel, the controller in each vehicle will update the zones 705 and 707 to reflect ongoing changes in the vehicles' positions. The driver of each truck may use to the inform zone to guide the maneuvering of their vehicle, and provide an indication of potential contention conditions.

Figure 7A:
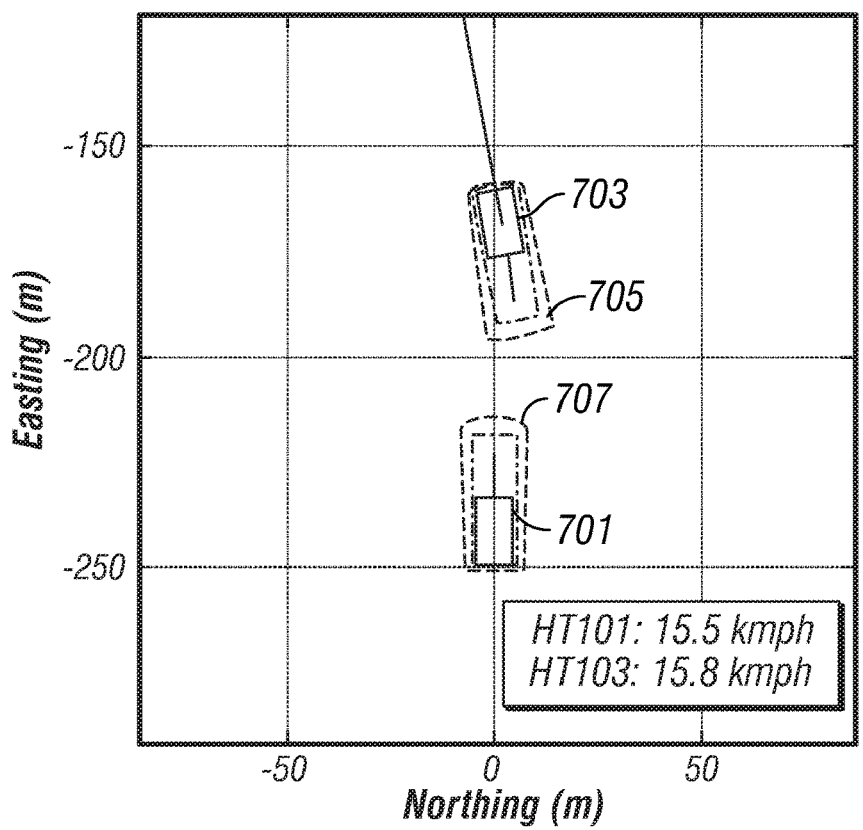
FIGS. 7A-7C depict a sequence of maneuvers showing two haul trucks approaching one another and depicting projected zones for each vehicle.
Figure 7B:
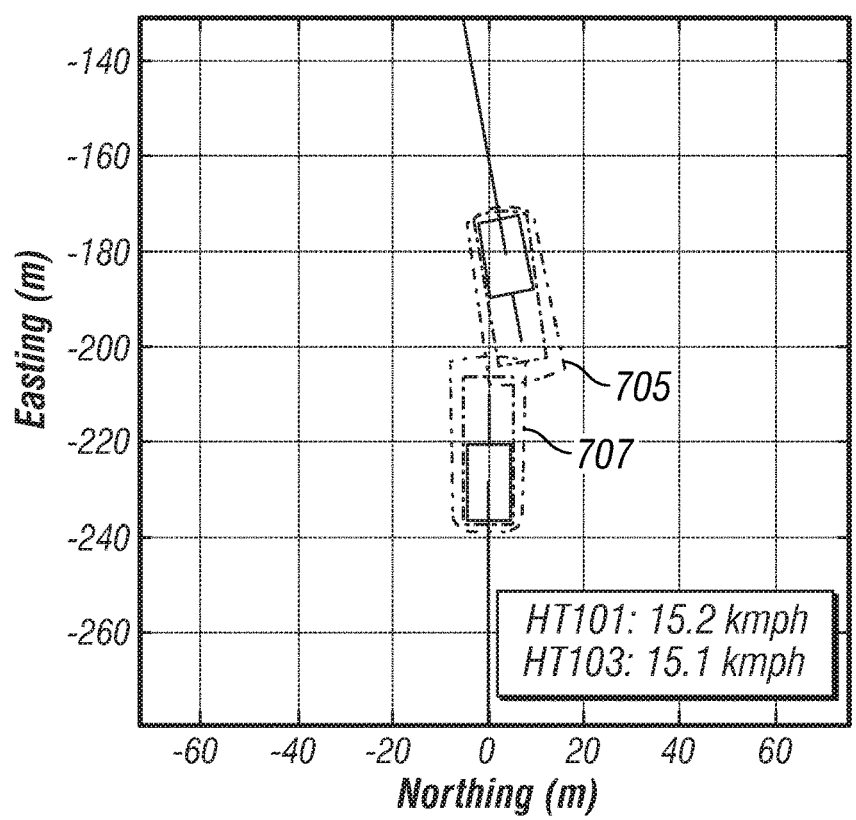
Figure 7C:
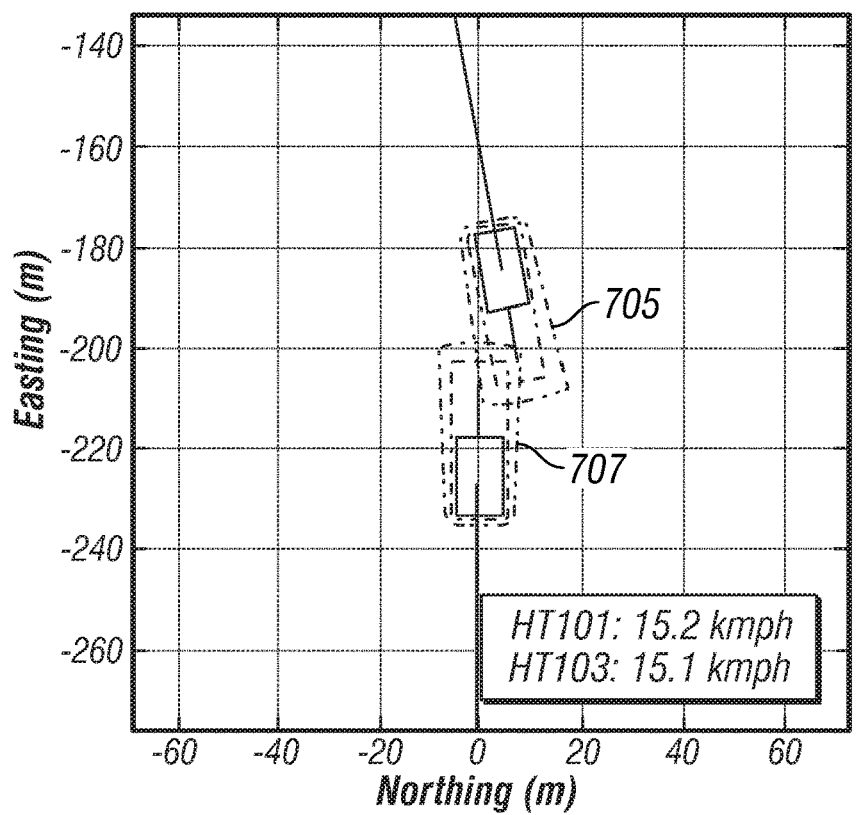

The image depicted on the display device in the two haul trucks may be oriented differently to reflect the viewpoint of the vehicle driver. For example, the depiction in FIG. 7*a* is the display device inside the haul truck represented by bounding box 701, showing the driver the position of a haul truck represented by bounding box 703 relative to his own truck (i.e. box 701). The haul truck represented by bounding box 703 will have the same depiction of the vehicles on a display device, but the figure will be oriented relative to box 703. In some embodiments, the partial zone overlap system may provide feedback to the drivers, such as a visual alert on the display or audio alert in the cab of the haul truck. For example, if inform zone 705 and 707 intersect or otherwise at least partially overlap, as in FIG. 7*b*, the system may trigger a feedback device to alert the drivers the zones overlap, and a contention or collision event could be possible. In this example, the vehicles continue to encroach upon one another, and warning zones 709, 711 overlap, as in FIG. 7*c*, the system may trigger a feedback device to warn the drivers of imminent contention of collision. In some embodiments, the feedback device may be configured to provide different type or intensity of alerts depending on if it is an inform or warning alert. For example, if a warning alert is triggered, the feedback device may be louder, brighter, or provided with more urgency than the inform alert, as the warning zone indicates more imminent danger.

In some embodiments, the feedback could be provided by screen 320 or user interface 324 of system 300 of FIG. 3, or other components of system 300. The feedback mechanism may include one or more alert (e.g., visual, audible, tactile, haptic, or otherwise) to indicate to the operator that the vehicle is approaching contention or collision conditions. This could also include notifications that indicate the operator should either speed up or slowdown in order to avoid the situation. Example human-machine interface devices include a display of the target speed, a series of lights showing the degree of overlap between inform or warning zones, or an audible alert that changes frequency or volume as the inform/warning zones overlap. The human-machine interfaces may be located on the vehicle or, in some cases, may be located along the route of the vehicle, such as in the form of signs or readouts that display a target speed, turn indications, or other instructions as the vehicle passes.

Figure 8A:
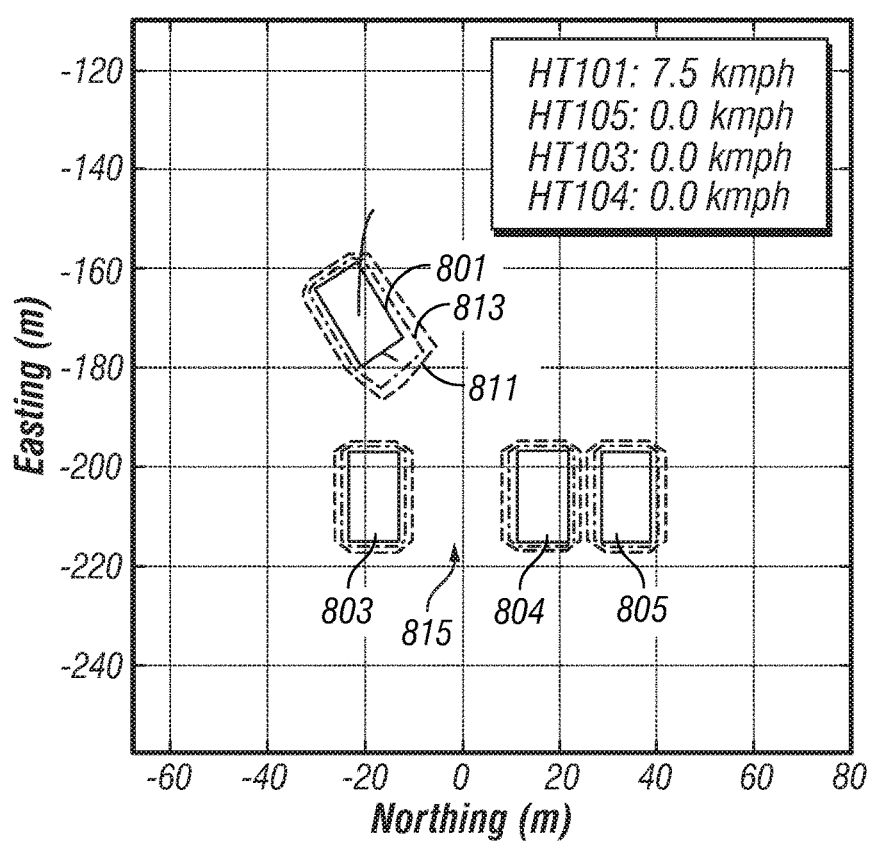
FIGS. 8A-8C depict a sequence of maneuvers showing a haul truck approaching a group of vehicles and depicting projected zones for each vehicle.
Figure 8B:
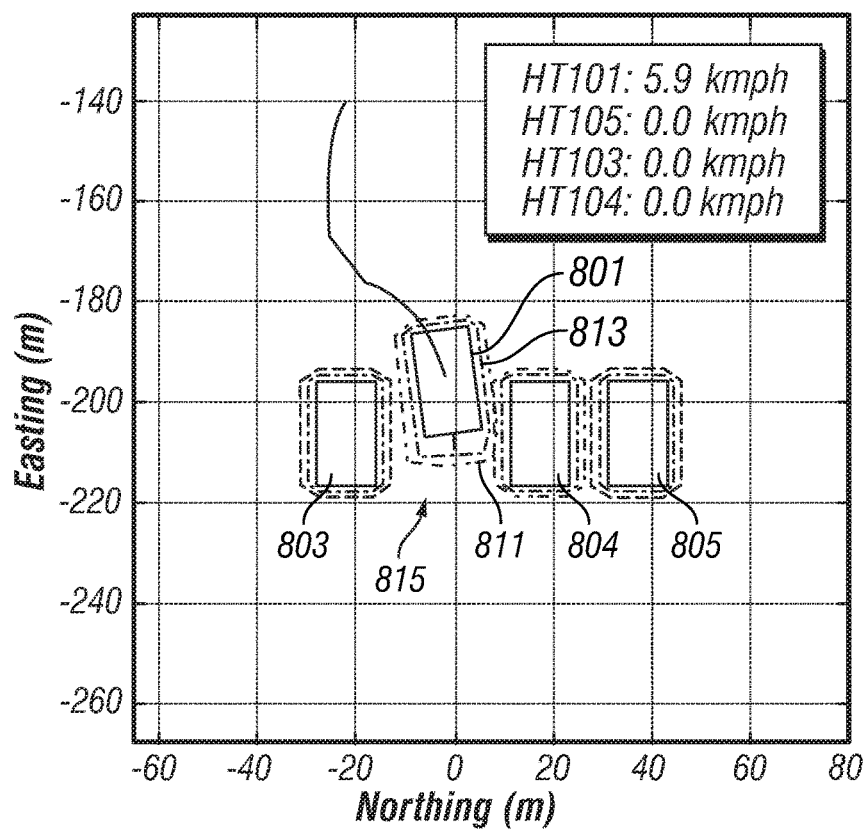
Figure 8C:
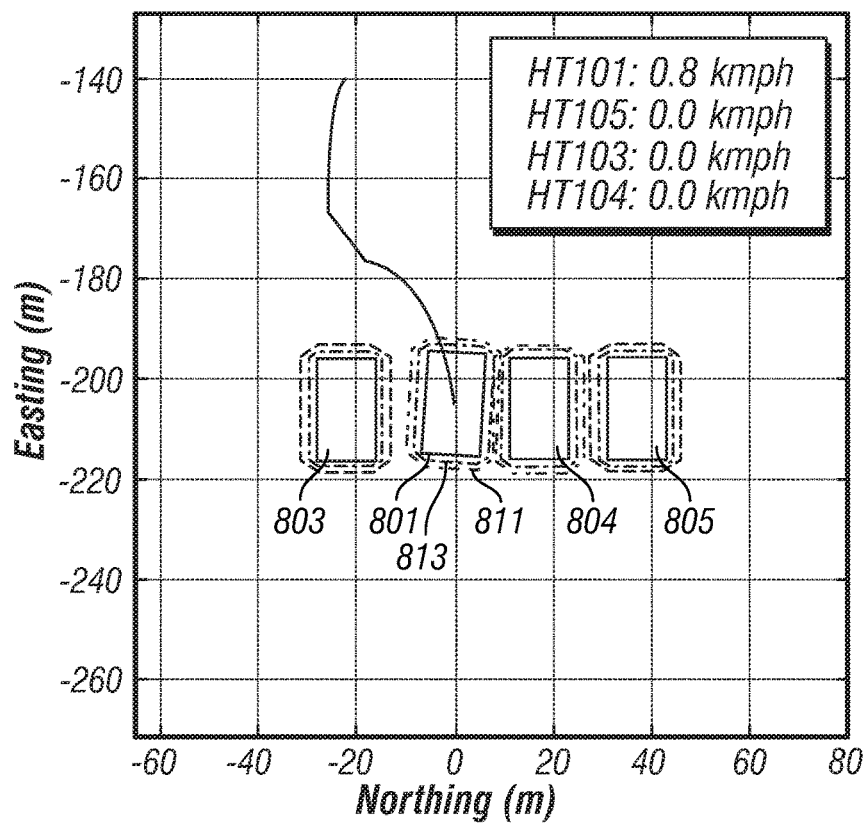

The present system may be implemented for stationary vehicles as well. FIGS. 8*a-c* depict a moving haul truck 801 approaching and parking in a row of haul trucks 803-805. Haul trucks 803-805 are stationary, and therefore the inform 807 and warning 809 zones are shaped similar to the bounding box of the vehicle with a fixed buffer. In FIG. 8*a*, haul truck 801, in motion, has inform 811 and warning 813 zones whose shapes are determined by the movement of the vehicle. As truck 801 approaches the parking space 815, the movement parameters of the vehicle may change. In FIG. 8*b*, the line representing stopping distance 817 is shorter than in FIG. 8*a*. This line became shorter as the vehicle speed decreased (and therefore its stopping distance decreased) as the vehicle maneuvered into position. In FIG. 8*c*, the vehicle has come to a complete stop, and inform 811 and warning 813 zones are now buffer zones that extend beyond the bounding box.

Figure 9:
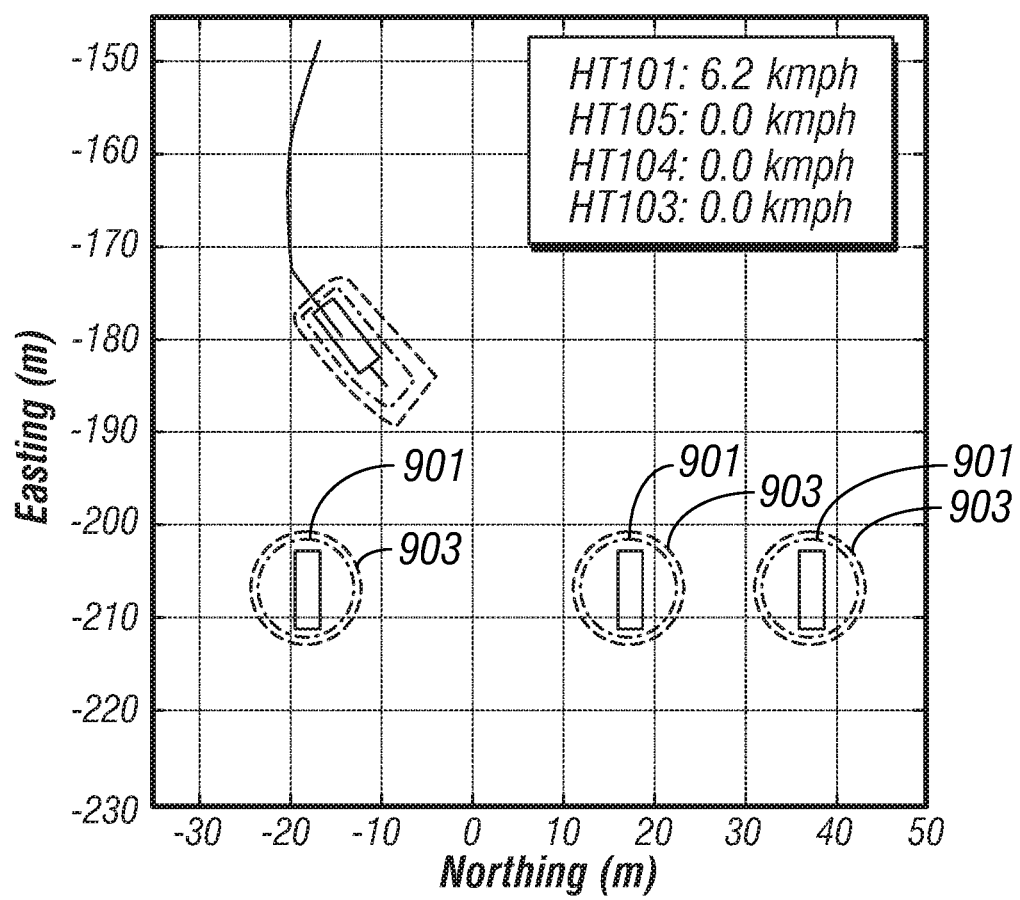
FIG. 9 is an alternative embodiment of the projected zone overlap system.

Some mining vehicles may be equipped with only a single antenna or position sensor. This may be particularly true for smaller vehicles, such as pickup trucks. In these situations, it may be difficult to compute the heading of the vehicle, particularly when the vehicle is stationary. As shown in FIG. 9, some embodiments may generate circular inform zone 901 and warning zone 903 that extend a fixed distance beyond the bounding box.

Figure 10A:
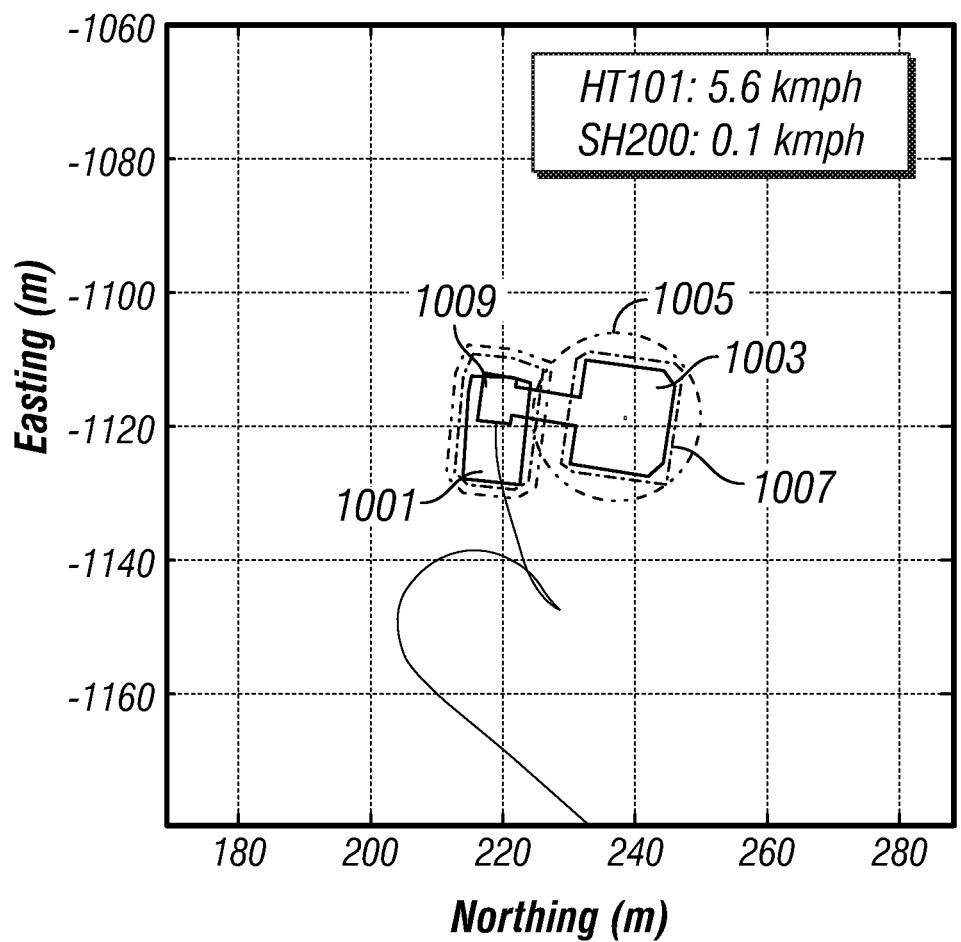
FIGS. 10A-10B depict an embodiments of a projected zone overlap system for a rotating vehicle.
Figure 10B:
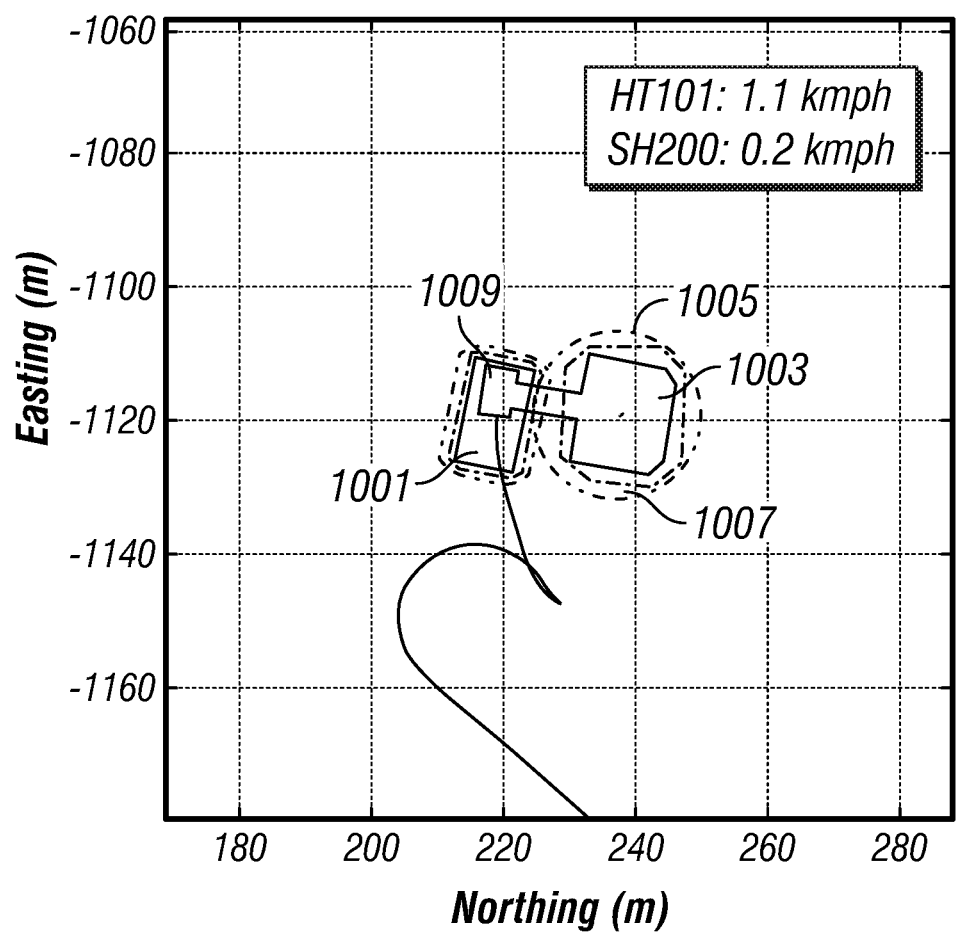

The circular halo approach may be implemented in other embodiments as well. FIG. 10a is an illustration of a haul truck 1001 in position underneath a shovel 1003 to receive a load. In this embodiment, there is a hybrid approach using the halo for inform zone 1005, and the bounding box based method described earlier for the warning zone 1007. In this example, the shovel boom 1009 may not be included in the warning or inform zones. There are a number of shovel-related parameters of interest that are used to identify one or more loading positions around the shovel that will not cause a collision. The most significant parameter is the shovel's location in the mine environment that may be measured directly by a GNSS receiver. Unlike haul trucks, shovels are typically stationary in the mine, and rotate about vertical axis on the shovel. Referring back to FIG. 10b, as the shovel rotates, the warning zone 1007 may adjust to account for the rotational movement of the shovel. In this illustration, shovel 1003 is rotating counter-clockwise, and warning zone 1007 computes that changing yaw angle to project where the body of the shovel may be located in the future. To compute this projection, the rotation of the shovel must be calculated from the center pin, or center of rotation of the shovel. In general, this may not coincide with the center of the shovel body. The position sensors 302 or GNSS rovers 404 located on shovels may be positioned in a known configuration relative to the center of rotation of the shovel body. This known configuration may be stored in a distributed objects database 304 or other memory module. When the controller 416 of a shovel receives positional information, such as latitude and longitude from GNSS receivers or the position sensors 302 of system 300, the controller 416 may access the configuration of sensors 302 or rovers 404 to compute the lateral and longitudinal offset of the center of rotation. As haul truck 1001 approaches shovel 1003, the two pieces of equipment share BSMs, communicating current and previous vehicle positional data. In some embodiments, the shovel 1003 may also communicate the lateral and longitudinal offset of the center of rotation in the BSM. In other embodiments, the controller on haul truck 1001 may access distributed objects database to retrieve information about the offset of the center of rotation. The shovel warning zone 1007 may be computed similarly to haul warning zone 1011 described previously, but using only the yaw angle to describe the rotation of the shovel body.

Figure 13A:
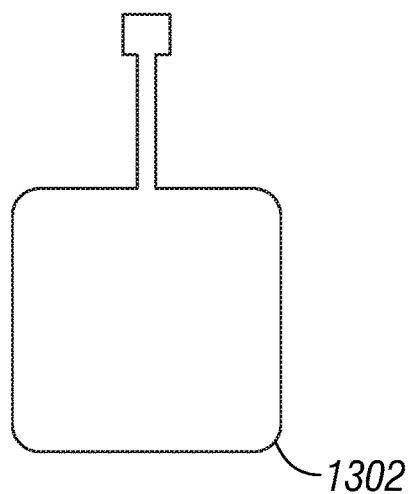
FIGS. 13A-13F are a sequence of diagrams depicting an approach for generating projected zone depictions for a rotating vehicle.

FIGS. 13A-13F depict a sequence of steps for determining a projected zone about a rotating vehicle, such as a shovel. Typically, the method is implemented within a two-dimensional representation of the mining environment. In a preliminary step, depicted in FIG. 13A, a location and orientation of the vehicle (e.g., a shovel in a mining environment) is determined. The location and orientation can be determined using any of the approaches and technologies described herein. With the location and heading of vehicle determined, a bounding box 1302 can be established for the vehicle, as shown in FIG. 13A, where bounding box 1302 is associated with the location and orientation of the vehicle. Data describing the geometry of bounding box 1302 could, for example, be stored within distributed objects database 304 of system 300, or in another suitable data repository.

Figure 13B:
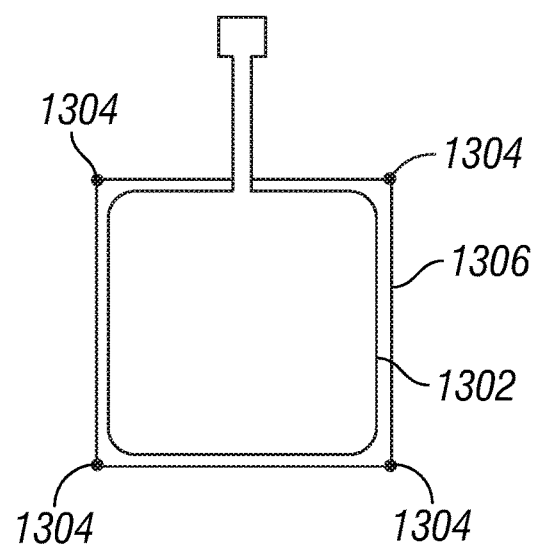

As depicted in FIG. 13B, a number of boundary points 1304 are positioned about bounding box 1302. Because bounding box 1302 generally follows the precise geometry or shape of the vehicle, bounding box 1302 does not provide any buffer space around the vehicle. Accordingly, as shown in FIG. 13B, bounding points 1304 are offset from the vehicle (i.e., bounding box 1302) to establish a boundary about bounding box 1302 and, ultimately, the vehicle, as described herein. For example, each of the bounding points 1304 may be positioned by identifying a corner of bounding box 1302 and locating the bounding points 1304 a distance away from bounding box 1302 (e.g., offset away from bounding box 1302 by a particular distance both laterally and longitudinally away from bounding box 1302).

Bounding points 1304 are connected to one another to form a boundary 1306 about bounding box 1302 of the vehicle. In this example, boundary 1306 encloses the main body of the shovel, but does not include the shovel's boom. This is because the shovel's boom will typically pass over a haul truck (or other vehicle) that is being loaded by the shovel. As such, during normal operations the shovel's boom may overlay nearby vehicles. But, a haul truck (or other vehicle) should never come into contact with or overlay the shovel's main body and, as such, boundary 1306 is drawn about the main body of the shovel represented by bounding box 1302.

Having established the locations of boundary points 1304 and the shape of boundary 1306, a current state of the rotating vehicle is analyzed. Specifically, a current rate of rotation of the vehicle (e.g., the rate of rotation of the shovel's body) is determined. The current rate of rotation may be determined by an analysis of historical GPS data, which tracks the bearing of the vehicle over time. That data can be smoothed and analyzed to determine a current rate of rotation. Additionally, a potential rate of rotational deceleration for the vehicle is determined. This is, in essence, the rate at which the rotation of the rotating vehicle can be slowed. A particular vehicle may have a number of different rates of rotational deceleration for different circumstances. For example, the vehicle may have a first rate of potential rotational deceleration if the vehicle's rotation were to be stopped by the vehicle's operator simply removing his or her hands from the vehicle's controls. Another rate of potential rotation deceleration could be determined for the vehicle if the vehicle's operator were to execute an emergency stop to rotation. Depending upon the different type of projected zone being calculated for the vehicle (e.g., a warning or alarm zone), different rotational deceleration rate may be utilized (e.g., the rate associated with an emergency stop or the rate associated with a normal stop). Data describing the different rates of deceleration for particular vehicles capable of rotation could be stored, for example, within distributed objects database 304 of system 300, or in another suitable data repository.

Figure 13C:
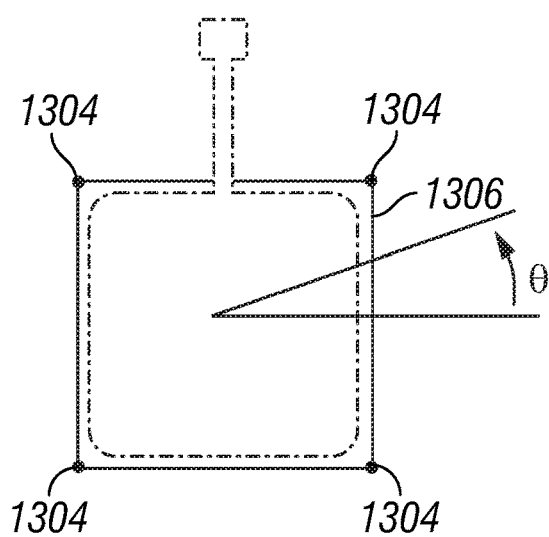

Using the determined rate of rotation of the vehicle, as well as the vehicle's potential rate of rotational deceleration, a stopping distance for the rotation can be determined. FIG. 13C, for example, depicts the anticipated movement of the vehicle, referred to as the rotational stopping distance $\Theta$ (measured in rotational units or degrees). In some embodiments, the rotational stopping distance or anticipated movement may be increased due to compensation for a reaction time of the vehicle's operator, loaded or unloaded state of the shovel's bucket, and/or other parameters affecting rotational stopping distance.

Figure 13D:
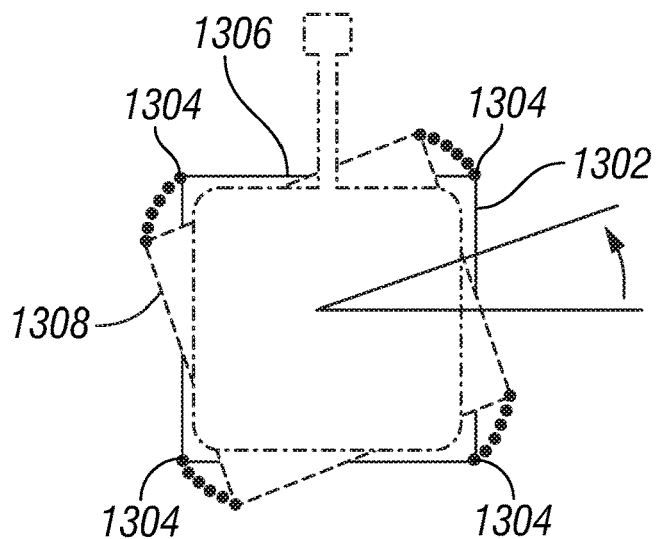

Having determined the rotational stopping distance for the vehicle, as depicted in FIG. 13D, boundary 1306 is rotated by that same rotational stopping distance (i.e., boundary 1306 is rotated by $\Theta$) to form a new boundary 1308. As boundary 1306 is rotated the position of boundary points 1304 may be tracked over time to generate a number of intermediary positions for each boundary points 1304 as boundary 1306 is rotated.

When rotating boundary 1306, boundary may be incrementally rotated through a number of intermediary rotational positions between the original position of boundary 1306 and the final rotational position Θ represented by boundary 1308. In the example depicted in FIG. 13D, boundary 1306 is rotated through 4 intermediary positions spaced rotationally between the position of boundary 1306 and boundary 1308. In other implementations, fewer or more intermediary rotational positions may be utilized.

Figure 13E:
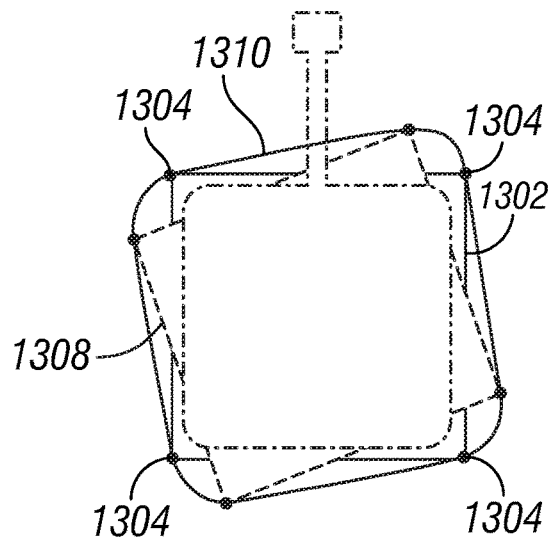
Figure 13F:
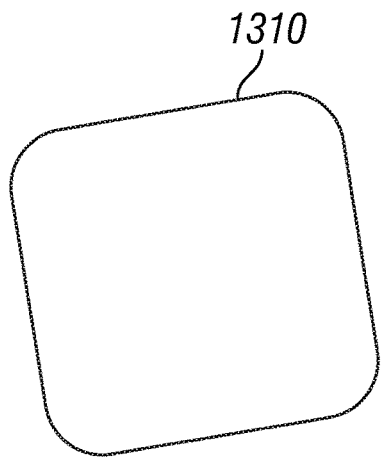

As depicted in FIGS. 13E and 13F, with boundary 1308 determined, as well as the intermediary positions of boundary points 1304, a convex hull 1310 is drawn about boundary 1306, boundary 1308, and boundary points 1304 (including their intermediary points). In this embodiment, convex hull 1310 is generally defined as a shape that is the smallest convex shape that contains all of boundary points 1304, boundary 1306 and boundary 1308. Convex hull 1310 becomes the projected zone for the vehicle indicated by bounding box 1302.

Depending upon the system implementation, the algorithm depicted in FIGS. 13A-13F may be adjusted to generate one or more projected zones for a rotating vehicle, where each projected zone may have different attributes. When generating a number of different zones for a vehicle (e.g., warning and alarm zones), the position of boundary points 1304 with respect to the vehicle's bounding box 1302 may also be adjusted.

Using the approach depicted in FIGS. 13A-13F, one or more zones may be generated for a rotating vehicle. The project zones may be recalculated to continuous update the size and shape of the projected zones as the vehicles continues to operate within the mining environment (or come to a stop). The zones may be re-calculated at a relatively high frequency (e.g., more often than every 5 seconds or every second) to ensure that the projected zones are accurate given the current state of the vehicle.

The present system monitors the movement of a number of vehicles within a mine environment and identifies possible points of contention.

In one implementation of the present system, the central control system is configured to monitor a position of vehicles operating within the mining environment. By analyzing those movements, and taking into consideration other constraints, the central system may identify potential collision conditions. The system may then take appropriate action to minimize the likelihood of the collision conditions occurring.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for example, comprise one or more physical or logical blocks of computer instructions which may, for example, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, punch card, flash memory, integrated circuits, or other digital processing apparatus memory device.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Where, "data storage media," or "computer readable media" is used, Applicants mean an information storage medium in combination with the hardware, firmware, and/or software, needed to write information to, and read information from, that information storage medium. In certain embodiments, the information storage medium comprises a magnetic information storage medium, such as and without limitation, a magnetic disk, magnetic tape, and the like. In certain embodiments, the information storage medium comprises an optical information storage medium, such as and without limitation, a CD, DVD (Digital Versatile Disk), HD-DVD (High Definition DVD), BD (Blue-Ray Disk) and the like. In certain embodiments, the information storage medium comprises an electronic information storage medium, such as and without limitation, a PROM, EPROM, EEPROM, Flash PROM, compactflash, smartmedia, and the like. In certain embodiments, the information storage medium comprises a holographic information storage medium.

Reference is made throughout this specification to "signals." Signals may be any time varying electromagnetic waveform, whether or not encoded with recoverable information. Signals, within the scope of this specification, may be modulated, or not, according to any modulation or encoding scheme. Additionally, any Fourier component of a signal, or combination of Fourier components, should be considered itself a signal as that term is used throughout this specification.

We claim:

1. A system, comprising:
a location sensor configured to output location data of a first vehicle;
a display device connected to the first vehicle; and
a processor configured to execute instructions for:
receiving location data from the location sensor to determine a historical path of rotation of the first vehicle about a vertical axis on the first vehicle, determining a current rotational speed about the axis and a current rotational position of the first vehicle using the location sensor,
determining an anticipated rotational path of travel of the first vehicle about the axis by extending the historical path of rotation by a distance determined by the current rotational speed of the first vehicle,
using the anticipated path of rotation of the first vehicle to determine a projected zone for the first vehicle, the projected zone identifying a region into which the first vehicle is likely to occupy, wherein, determining a projected zone includes:
determining a current rate of rotation of the vehicle about a vertical axis on the vehicle;
determining a rotational stopping distance for the vehicle based upon the current rate of rotation;
defining a vehicle boundary using a current location of the first vehicle;
defining a first set of boundary points, each boundary point in the first set of boundary points being located on the vehicle boundary;
rotating the vehicle boundary by an angle determined by the rotational stopping distance to generate a rotated vehicle boundary; and
defining a second set of boundary points, each boundary point in the second set of boundary points being located on the rotated vehicle boundary;

determining that the projected zone overlaps, at least partially, with a second projected zone for a second vehicle,
generating an output at the display device indicating a potential collision condition with the second vehicle.

2. The system of claim 1, wherein the processor is configured to execute instructions for determining a rotational stopping distance of the first vehicle based upon the current speed of the first vehicle and wherein a length of the anticipated path of rotation is determined by the stopping distance.

3. The system of claim 2, wherein the processor is configured to execute instructions for:
determining an estimated reaction time of an operator of the first vehicle;
determining a reaction distance based upon the current rotational speed of the first vehicle and the estimated reaction time; and
determining the length of the anticipated path of rotation is equal to the stopping distance plus the reaction distance.

4. The system of claim 1, wherein the processor is configured to determine the projected zone by:
defining a vehicle boundary using the current location of the first vehicle;
defining a first vehicle boundary point at a first location on the vehicle boundary, wherein the first location is proximate a front left corner of the vehicle boundary;
defining a first zone boundary point as a point at an end of a first line extending from the first vehicle boundary point, the first zone boundary point being offset laterally and longitudinally away from the first vehicle boundary point;
defining a second vehicle boundary point at a second location on the vehicle boundary, wherein the second location is proximate a front right corner of the vehicle boundary; and
defining a second zone boundary point as a point at an end of a second line extending from the second vehicle boundary point, the second zone boundary point being offset laterally and longitudinally away from the second vehicle boundary point.

5. The system of claim 4, wherein the processor is configured to determine the projected zone by drawing a convex hull about the first vehicle boundary point, the second vehicle boundary point, the first zone boundary point, and the second zone boundary point.

6. A system, comprising:
a location sensor configured to output location data of a first vehicle;
a user interface device connected to the first vehicle; and
a processor configured to execute instructions for:
determining an anticipated rotational movement of the first vehicle based upon location data received from the location sensor,
using the anticipated rotational movement of the first vehicle to determine a projected zone about the first vehicle, the projected zone identifying a region into which the first vehicle is likely to proceed based on the anticipated movement,
determining that the projected zone about the first vehicle overlaps, at least partially, with a second projected zone about a second vehicle, and
generating an output at the user interface device indicating a potential collision condition with the second vehicle, wherein the processor is configured to execute instructions for determining the projected zone by:
- determining a current rate of rotation of the vehicle about a vertical axis on the vehicle;
- determining a rotational stopping distance for the vehicle based upon the current rate of rotation;
- defining a vehicle boundary using a current location of the first vehicle;
- defining a first set of boundary points, each boundary point in the first set of boundary points being located on the vehicle boundary;
- rotating the vehicle boundary by an angle determined by the rotational stopping distance to generate a rotated vehicle boundary; and
- defining a second set of boundary points, each boundary point in the second set of boundary points being located on the rotated vehicle boundary.

7. The system of claim 6, wherein the processor is configured to execute instructions for:
- receiving location data from the location sensor to determine a historical path of rotation of the vehicle;
- determining an anticipated path of rotation of the first vehicle by extending the historical path of rotation by an extent determined by the current rate of rotation of the first vehicle; and
- determining the anticipated rotation of the first vehicle using the anticipated path of rotation.

8. The system of claim 6, wherein the processor is configured to execute instructions for:
- determining an estimated reaction time;
- determining a reaction distance based upon the current rate of rotation of the first vehicle and the estimated reaction time; and
- further rotating the vehicle boundary by an angle determined by the reaction distance.

9. The system of claim 6, wherein the processor is configured to execute instructions for determining the projected zone by drawing a convex hull about the first set of boundary points and the second set of boundary points.

10. A method, comprising:
- determining, using historical location data from a location sensor, an anticipated rotation of a vehicle about a vertical axis on the vehicle;
- using the anticipated rotation of the first vehicle to determine a projected zone about the first vehicle, the projected zone identifying a region into which the first vehicle is likely to rotate based on the anticipated rotation, wherein determining a projected zone comprises:
  - determining a current rate of rotation of the vehicle about a vertical axis on the vehicle;
  - determining a rotational stopping distance for the vehicle based upon the current rate of rotation;
  - defining a vehicle boundary using a current location of the first vehicle;
  - defining a first set of boundary points, each boundary point in the first set of boundary points being located on the vehicle boundary;
  - rotating the vehicle boundary by an angle determined by the rotational stopping distance to generate a rotated vehicle boundary; and
  - defining a second set of boundary points, each boundary point in the second set of boundary points being located on the rotated vehicle boundary;
- determining that the projected zone about the first vehicle overlaps, at least partially, with a second projected zone about a second vehicle or a location within a threshold distance of the second vehicle; and
- generating an output at a user interface device in the first vehicle indicating a potential collision condition with the second vehicle.

11. The method of claim 10, further comprising:
- determining an estimated reaction time;
- determining a reaction distance based upon the current speed of rotation the first vehicle and the estimated reaction time; and
- determining the length of the anticipated path of rotation using the stopping distance plus the reaction distance.

12. The method of claim 10, further comprising determining the projected zone by:
- determining a current rate of rotation of the vehicle;
- determining a rotational stopping distance for the vehicle based upon the current rate of rotation;
- defining a vehicle boundary using a current location of the first vehicle;
- defining a first set of boundary points, locations of each boundary point in the first set of boundary points being determined by the vehicle boundary; and
- rotating the vehicle boundary by an angle determined by the rotational stopping distance to generate a rotated vehicle boundary.

13. The method of claim 12, further comprising determining the projected zone by drawing a convex hull about the first set of boundary points and the rotated vehicle boundary.

\* \* \* \* \*